(12) United States Patent
Kamalpour

(10) Patent No.: US 12,149,616 B1
(45) Date of Patent: *Nov. 19, 2024

(54) SYSTEMS AND METHODS FOR DIGITAL DATA MANAGEMENT INCLUDING CREATION OF STORAGE LOCATION WITH STORAGE ACCESS ID

(71) Applicant: Massood Kamalpour, Novato, CA (US)

(72) Inventor: Massood Kamalpour, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,536

(22) Filed: May 16, 2024

Related U.S. Application Data

(63) Continuation-in-part of application No. 18/418,086, filed on Jan. 19, 2024, now Pat. No. 11,991,281, which is a continuation-in-part of application No. 18/385,854, filed on Oct. 31, 2023, now Pat. No. 11,941,262.

(51) Int. Cl.
| | | |
|---|---|---|
| *H04L 9/08* | (2006.01) | |
| *G06F 21/45* | (2013.01) | |
| *H04L 9/32* | (2006.01) | |

(52) U.S. Cl.
CPC ............ *H04L 9/0863* (2013.01); *G06F 21/45* (2013.01); *H04L 9/3226* (2013.01)

(58) Field of Classification Search
CPC ...... H04L 9/0863; H04L 9/3226; G06F 21/45
See application file for complete search history.

(56) References Cited

U.S. PATENT DOCUMENTS

| | | | |
|---|---|---|---|
| 5,802,175 A | 9/1998 | Kara | |
| 6,038,551 A | 3/2000 | Barlow et al. | |
| 6,226,750 B1 | 5/2001 | Trieger | |
| 6,724,895 B1 * | 4/2004 | Turner | G07C 9/27 |
| | | | 713/168 |
| 7,010,689 B1 | 3/2006 | Matyas et al. | |
| 7,313,823 B2 | 12/2007 | Gao | |
| 7,492,258 B1 | 2/2009 | Shoarinejad et al. | |
| 8,321,682 B1 | 11/2012 | Read et al. | |

(Continued)

OTHER PUBLICATIONS

Notice of Allowance for U.S. Appl. No. 18/385,854, mailed Feb. 14, 2024, 19 pages.

(Continued)

*Primary Examiner* — Aravind K Moorthy
(74) *Attorney, Agent, or Firm* — Cozen O'Connor

(57) ABSTRACT

A device and method manage digital data. The device and method may receive a trusted-phrase text string at a client device. The device and method may receive an application pin number (APN) associated with a user. The device and method may process the APN to determine a selector value. The device and method may extract a portion of the trusted-phrase text string based on the selector value to yield a sub-trusted-phrase text string, generating a storage access ID (SAID), the SAID including the APN and the sub-trusted-phrase-text string encrypted using the trusted-phrase text string as an encryption phrase; and, outputting the SAID to an external device, for creation of a data storage location at a storage server, the data storage location having a name based on the SAID. The device and method may include ability to recover the trusted-phrase text string.

38 Claims, 14 Drawing Sheets

(56) References Cited

U.S. PATENT DOCUMENTS

| | | |
|---|---|---|
| 8,347,398 B1 | 1/2013 | Weber |
| 8,683,452 B1 | 3/2014 | Hodgman et al. |
| 8,868,923 B1 | 10/2014 | Hamlet et al. |
| 8,879,785 B1 | 11/2014 | Amacker |
| 8,891,769 B2 | 11/2014 | Furukawa |
| 8,893,009 B2 | 11/2014 | Raleigh et al. |
| 9,160,722 B2 | 10/2015 | Gavrilov |
| 9,298,939 B2 * | 3/2016 | Margolin ............ G06F 21/6209 |
| 9,300,643 B1 | 3/2016 | Doane |
| 9,338,652 B1 | 5/2016 | Allen et al. |
| 9,438,597 B1 | 9/2016 | Taylor et al. |
| 9,454,677 B1 | 9/2016 | Sinclair et al. |
| 9,496,897 B1 * | 11/2016 | Triandopoulos .... H04L 63/0435 |
| 9,569,606 B2 | 2/2017 | Kaplan et al. |
| 9,584,530 B1 | 2/2017 | Statica et al. |
| 9,635,011 B1 | 4/2017 | Wu et al. |
| 10,020,939 B2 * | 7/2018 | Lee ....................... H04L 9/0897 |
| 10,268,817 B1 * | 4/2019 | Pham ....................... G06F 21/45 |
| 10,313,117 B1 | 6/2019 | Carlough et al. |
| 10,853,955 B1 | 12/2020 | Monaghan et al. |
| 10,892,892 B1 | 1/2021 | Mehta et al. |
| 10,931,662 B1 | 2/2021 | Church |
| 11,044,257 B1 | 6/2021 | Heuts et al. |
| 11,163,893 B2 | 11/2021 | Cohen et al. |
| 11,258,590 B1 | 2/2022 | Tsarfati et al. |
| 11,328,087 B1 | 5/2022 | Allen et al. |
| 11,379,611 B1 | 7/2022 | Horesh et al. |
| 11,381,584 B1 | 7/2022 | Mctor et al. |
| 11,501,012 B1 | 11/2022 | Milich et al. |
| 11,550,896 B2 | 1/2023 | McLean et al. |
| 11,558,375 B1 | 1/2023 | Cao et al. |
| 11,563,567 B2 | 1/2023 | Le Saint |
| 11,640,484 B1 | 5/2023 | Kumar |
| 11,669,927 B2 | 6/2023 | De Corte et al. |
| 11,677,557 B1 * | 6/2023 | Tree ....................... H04L 9/3271 |
| | | 713/168 |
| 11,748,521 B2 | 9/2023 | Austin et al. |
| 11,762,846 B1 | 9/2023 | Atherton et al. |
| 11,849,037 B1 * | 12/2023 | Tong ....................... G06F 9/541 |
| 11,853,109 B1 | 12/2023 | David et al. |
| 11,853,449 B1 | 12/2023 | Fu et al. |
| 11,895,222 B1 | 2/2024 | White et al. |
| 11,941,262 B1 * | 3/2024 | Kamalpour ............ G06F 21/00 |
| 11,991,281 B1 * | 5/2024 | Kamalpour ......... G06F 21/6218 |
| 2002/0018563 A1 | 2/2002 | Tichenor |
| 2002/0099942 A1 | 7/2002 | Gohl |
| 2002/0164020 A1 | 11/2002 | Mustafa |
| 2002/0188854 A1 | 12/2002 | Heaven et al. |
| 2003/0105964 A1 * | 6/2003 | Brainard ............... G06Q 20/385 |
| | | 713/178 |
| 2003/0182246 A1 | 9/2003 | Johnson et al. |
| 2003/0212894 A1 * | 11/2003 | Buck ....................... H04L 9/0863 |
| | | 713/184 |
| 2003/0226017 A1 | 12/2003 | Palekar et al. |
| 2004/0073815 A1 | 4/2004 | Sanai et al. |
| 2004/0139329 A1 | 7/2004 | Abdallah et al. |
| 2004/0167857 A1 | 8/2004 | Baker et al. |
| 2005/0038998 A1 | 2/2005 | Ueno et al. |
| 2005/0091509 A1 | 4/2005 | Herberth |
| 2005/0132203 A1 | 6/2005 | Dharmarajan |
| 2006/0041762 A1 * | 2/2006 | Ma ....................... H04L 9/3226 |
| | | 713/189 |
| 2006/0107056 A1 | 5/2006 | Bhatt et al. |
| 2006/0177065 A1 * | 8/2006 | Halbert ................. H04L 9/0662 |
| | | 380/277 |
| 2007/0055893 A1 | 3/2007 | Dodd |
| 2007/0058811 A1 * | 3/2007 | Fitzgibbon ............ H04L 9/3226 |
| | | 380/268 |
| 2007/0079092 A1 | 4/2007 | Hara et al. |
| 2007/0118479 A1 | 5/2007 | Halsema et al. |
| 2007/0124798 A1 * | 5/2007 | Dennis ................. H04L 9/3226 |
| | | 726/2 |
| 2007/0136606 A1 | 6/2007 | Mizuno |
| 2007/0234050 A1 * | 10/2007 | Hillar .................... H04L 9/3226 |
| | | 713/168 |
| 2007/0253553 A1 | 11/2007 | Abdul |
| 2007/0269041 A1 | 11/2007 | Bhatnagar et al. |
| 2008/0033960 A1 | 2/2008 | Banks et al. |
| 2008/0052525 A1 | 2/2008 | Botchek |
| 2008/0092216 A1 * | 4/2008 | Kawano .................. G06F 21/46 |
| | | 726/5 |
| 2008/0144817 A1 * | 6/2008 | Brown .................. H04L 9/0863 |
| | | 380/44 |
| 2008/0222734 A1 * | 9/2008 | Redlich ................. H04L 9/3271 |
| | | 726/26 |
| 2008/0263361 A1 * | 10/2008 | Dutta .................... H04L 9/0891 |
| | | 713/182 |
| 2009/0103722 A1 | 4/2009 | Anderson et al. |
| 2009/0169010 A1 | 7/2009 | Dodd |
| 2010/0010968 A1 | 1/2010 | Redlich et al. |
| 2010/0031023 A1 | 2/2010 | Dodd |
| 2010/0089998 A1 | 4/2010 | Sandstrom et al. |
| 2010/0100724 A1 * | 4/2010 | Kaliski, Jr. ........... H04L 9/3226 |
| | | 713/171 |
| 2010/0138382 A1 | 6/2010 | Nagoya et al. |
| 2010/0189257 A1 | 7/2010 | Bjorkengren et al. |
| 2010/0239087 A1 * | 9/2010 | Chaisson .............. H04L 9/0863 |
| | | 380/44 |
| 2010/0246811 A1 | 9/2010 | Sadler |
| 2010/0250959 A1 | 9/2010 | Challener et al. |
| 2010/0275257 A1 | 10/2010 | Nishida |
| 2010/0322418 A1 | 12/2010 | Potkonjak |
| 2010/0325654 A1 | 12/2010 | Moroney et al. |
| 2011/0055586 A1 | 3/2011 | Lupton et al. |
| 2011/0072510 A1 | 3/2011 | Cheswick |
| 2011/0161670 A1 | 6/2011 | Chase et al. |
| 2011/0162078 A1 | 6/2011 | Taveau et al. |
| 2011/0247062 A1 | 10/2011 | Zon et al. |
| 2011/0258452 A1 | 10/2011 | Coulier et al. |
| 2012/0039469 A1 * | 2/2012 | Mueller ............... G06Q 20/204 |
| | | 380/252 |
| 2012/0060037 A1 | 3/2012 | Trimberger |
| 2012/0082306 A1 * | 4/2012 | Hulse ....................... G06F 21/36 |
| | | 380/28 |
| 2012/0110680 A1 | 5/2012 | Oliver et al. |
| 2012/0202428 A1 | 8/2012 | Mirbaha et al. |
| 2012/0233677 A1 | 9/2012 | Kowalewski |
| 2012/0254622 A1 | 10/2012 | Kanungo |
| 2012/0283010 A1 * | 11/2012 | Koerkel ................. H04L 9/0869 |
| | | 463/29 |
| 2012/0284534 A1 | 11/2012 | Yang |
| 2012/0324228 A1 * | 12/2012 | Padhye .................... H04L 9/321 |
| | | 713/176 |
| 2013/0046982 A1 | 2/2013 | Suh et al. |
| 2013/0067226 A1 | 3/2013 | Kunde et al. |
| 2013/0073849 A1 | 3/2013 | Wang |
| 2013/0259292 A1 | 10/2013 | Massimino |
| 2013/0275757 A1 * | 10/2013 | Harrington ........... H04L 9/0662 |
| | | 713/171 |
| 2013/0290716 A1 | 10/2013 | Gavrilov |
| 2014/0006797 A1 | 1/2014 | Cordella et al. |
| 2014/0101735 A1 | 4/2014 | Drenkard et al. |
| 2014/0108791 A1 | 4/2014 | Sinclair et al. |
| 2014/0189359 A1 | 7/2014 | Marien et al. |
| 2014/0208102 A1 | 7/2014 | Pryakhin et al. |
| 2014/0241513 A1 | 8/2014 | Springer |
| 2014/0289870 A1 | 9/2014 | Selander et al. |
| 2014/0314231 A1 * | 10/2014 | Gilbert ................. H04L 9/3239 |
| | | 380/46 |
| 2015/0220756 A1 | 8/2015 | Hoseley et al. |
| 2015/0227930 A1 * | 8/2015 | Quigley ................. H04L 9/3013 |
| | | 705/72 |
| 2015/0235012 A1 * | 8/2015 | Wang .................... H04L 9/3226 |
| | | 713/192 |
| 2015/0244681 A1 | 8/2015 | Blumenfeld et al. |
| 2015/0324554 A1 | 11/2015 | Durbha et al. |
| 2016/0099935 A1 | 4/2016 | Luskin et al. |
| 2016/0105414 A1 * | 4/2016 | Bringer ................. H04L 9/3247 |
| | | 713/168 |
| 2016/0112396 A1 | 4/2016 | Paya et al. |
| 2016/0132676 A1 | 5/2016 | Avganim |

(56) References Cited

U.S. PATENT DOCUMENTS

| | | |
|---|---|---|
| 2016/0219024 A1 | 7/2016 | Verzun et al. |
| 2016/0226827 A1 | 8/2016 | Bohannon |
| 2016/0239832 A1 | 8/2016 | Knorr |
| 2016/0380985 A1 | 12/2016 | Chhabra et al. |
| 2017/0005999 A1 | 1/2017 | Choyi et al. |
| 2017/0085377 A1* | 3/2017 | Pogmore ............... H04L 9/0869 |
| 2017/0085378 A1 | 3/2017 | Shields et al. |
| 2017/0099144 A1 | 4/2017 | Sobel |
| 2017/0103647 A1 | 4/2017 | Davis |
| 2017/0142084 A1 | 5/2017 | Nataros |
| 2017/0163419 A1 | 6/2017 | Stuntebeck et al. |
| 2017/0193025 A1 | 7/2017 | McLellan |
| 2017/0237725 A1 | 8/2017 | Camenisch et al. |
| 2017/0262845 A1 | 9/2017 | Eisen |
| 2018/0005469 A1 | 1/2018 | Campbell et al. |
| 2018/0091520 A1 | 3/2018 | Camenisch et al. |
| 2018/0095812 A1* | 4/2018 | Deutsch ............... H04L 9/14 |
| 2018/0134253 A1* | 5/2018 | Zielinski ............... H04L 9/0618 |
| 2018/0159842 A1 | 6/2018 | Lurey et al. |
| 2018/0189245 A1* | 7/2018 | Ghafourifar ........ G06F 40/103 |
| 2018/0191733 A1 | 7/2018 | Kundu et al. |
| 2018/0227278 A1 | 8/2018 | Camenisch et al. |
| 2018/0248862 A1 | 8/2018 | Farrell et al. |
| 2018/0260556 A1 | 9/2018 | Avganim |
| 2018/0262337 A1* | 9/2018 | Zubov ............... H04L 9/3226 |
| 2018/0293177 A1 | 10/2018 | Gerhart et al. |
| 2018/0359811 A1 | 12/2018 | Verzun et al. |
| 2019/0020629 A1 | 1/2019 | Baird et al. |
| 2019/0036913 A1* | 1/2019 | Tzur-David ............. H04L 63/18 |
| 2019/0036932 A1 | 1/2019 | Bathen et al. |
| 2019/0068375 A1* | 2/2019 | McCord ............... G06F 21/72 |
| 2019/0073460 A1* | 3/2019 | Lubetkin ............... G06F 21/32 |
| 2019/0087113 A1 | 3/2019 | Isozaki et al. |
| 2019/0087566 A1 | 3/2019 | Hosie |
| 2019/0122007 A1 | 4/2019 | Van Antwerpen et al. |
| 2019/0123901 A1* | 4/2019 | Vijayanarayanan .... H04L 9/321 |
| 2019/0229924 A1 | 7/2019 | Chhabra et al. |
| 2019/0230156 A1 | 7/2019 | McLarty et al. |
| 2019/0273796 A1 | 9/2019 | Allgeier et al. |
| 2019/0289017 A1 | 9/2019 | Agarwal |
| 2019/0306157 A1* | 10/2019 | Lores ............... H04L 63/126 |
| 2019/0318356 A1* | 10/2019 | Martin ............... H04L 9/0637 |
| 2019/0327311 A1 | 10/2019 | Khassanov et al. |
| 2019/0394021 A1 | 12/2019 | Awad et al. |
| 2020/0045038 A1 | 2/2020 | Mumma et al. |
| 2020/0065527 A1 | 2/2020 | Rodgers et al. |
| 2020/0067887 A1 | 2/2020 | Sarwar |
| 2020/0089896 A1* | 3/2020 | Ragsdale ............... H04L 9/0863 |
| 2020/0106618 A1* | 4/2020 | Osborn ............... H04L 9/14 |
| 2020/0106626 A1 | 4/2020 | Wallrabenstein |
| 2020/0145396 A1 | 5/2020 | Kondapavuluri et al. |
| 2020/0177366 A1 | 6/2020 | Han et al. |
| 2020/0186350 A1 | 6/2020 | Wentz et al. |
| 2020/0195433 A1 | 6/2020 | Collier et al. |
| 2020/0228341 A1 | 7/2020 | Mohassel et al. |
| 2020/0228515 A1* | 7/2020 | Hassan ............... H04L 9/3226 |
| 2020/0242231 A1* | 7/2020 | Neichev ............... H04L 63/0428 |
| 2020/0280551 A1 | 9/2020 | Wallrabenstein |
| 2020/0285766 A1 | 9/2020 | Jois et al. |
| 2020/0295926 A1 | 9/2020 | Androulaki et al. |
| 2020/0296227 A1* | 9/2020 | Yamada ............... H04N 1/4413 |
| 2020/0304601 A1 | 9/2020 | Zhang et al. |
| 2020/0311250 A1* | 10/2020 | Sandstrom ............... G06F 21/36 |
| 2020/0320206 A1 | 10/2020 | Cammarota et al. |
| 2020/0387594 A1* | 12/2020 | Sandstrom ............ G06F 21/316 |
| 2020/0396088 A1 | 12/2020 | Master |
| 2021/0014051 A1* | 1/2021 | Akoob ............... H04L 9/0825 |
| 2021/0056053 A1 | 2/2021 | Marson et al. |
| 2021/0073370 A1 | 3/2021 | Green et al. |
| 2021/0097125 A1 | 4/2021 | Khanna et al. |
| 2021/0109870 A1 | 4/2021 | Sahita et al. |
| 2021/0165909 A1* | 6/2021 | Park ............... G06F 21/6218 |
| 2021/0166152 A1 | 6/2021 | Gomez |
| 2021/0176070 A1 | 6/2021 | Liu et al. |
| 2021/0218547 A1 | 7/2021 | Weiler et al. |
| 2021/0224422 A1 | 7/2021 | Reeve |
| 2021/0226791 A1 | 7/2021 | Kusagawa |
| 2021/0248090 A1 | 8/2021 | Martin et al. |
| 2021/0281393 A1 | 9/2021 | Samid |
| 2021/0344492 A1 | 11/2021 | Goodsitt et al. |
| 2021/0377273 A1 | 12/2021 | Lu et al. |
| 2022/0058283 A1 | 2/2022 | Garner et al. |
| 2022/0058905 A1 | 2/2022 | Dobbins et al. |
| 2022/0092221 A1 | 3/2022 | Scillieri et al. |
| 2022/0108284 A1 | 4/2022 | Hosp et al. |
| 2022/0116385 A1 | 4/2022 | Hertrich et al. |
| 2022/0131698 A1 | 4/2022 | Badrinarayanan et al. |
| 2022/0166601 A1* | 5/2022 | Farooq ............... H04L 9/0631 |
| 2022/0166607 A1 | 5/2022 | Ratha et al. |
| 2022/0171844 A1 | 6/2022 | Ehrath |
| 2022/0172647 A1 | 6/2022 | Peled et al. |
| 2022/0255743 A1 | 8/2022 | Vágujhelyi et al. |
| 2022/0278839 A1 | 9/2022 | Samid |
| 2022/0284090 A1* | 9/2022 | Taylor ............... G06F 21/316 |
| 2022/0286288 A1* | 9/2022 | Nelson ............... H04L 9/0866 |
| 2022/0300656 A1* | 9/2022 | White ............... G06F 21/6227 |
| 2022/0382885 A1 | 12/2022 | Durham et al. |
| 2023/0019584 A1 | 1/2023 | Benisty |
| 2023/0020730 A1* | 1/2023 | Rasbornig ............... H04L 9/12 |
| 2023/0025870 A1 | 1/2023 | Fujita |
| 2023/0070125 A1 | 3/2023 | Evans et al. |
| 2023/0096860 A1* | 3/2023 | Cambou ............... H04L 9/3268 |
| | | 713/189 |
| 2023/0102341 A1 | 3/2023 | Chiang |
| 2023/0110856 A1* | 4/2023 | Katiyar ............... H04L 9/0869 |
| | | 713/168 |
| 2023/0113896 A1 | 4/2023 | Milazzo et al. |
| 2023/0120668 A1 | 4/2023 | Wikramaratna |
| 2023/0128099 A1 | 4/2023 | Nunez Mencias et al. |
| 2023/0137345 A1 | 5/2023 | Liberty et al. |
| 2023/0177142 A1 | 6/2023 | Singh |
| 2023/0179418 A1 | 6/2023 | Noh et al. |
| 2023/0208639 A1 | 6/2023 | Tung et al. |
| 2023/0230066 A1 | 7/2023 | Jakobsson et al. |
| 2023/0244797 A1* | 8/2023 | Luo ............... H04L 9/0825 |
| | | 713/193 |
| 2023/0247088 A1 | 8/2023 | Kondratiev et al. |
| 2023/0247436 A1* | 8/2023 | Boettger ............... H04W 12/06 |
| | | 713/155 |
| 2023/0254160 A1 | 8/2023 | Wang et al. |
| 2023/0259639 A1 | 8/2023 | Tsai et al. |
| 2023/0275742 A1 | 8/2023 | Kandele et al. |
| 2023/0344804 A1 | 10/2023 | Thyagaturu et al. |
| 2023/0361986 A1 | 11/2023 | Genise et al. |
| 2024/0007468 A1 | 1/2024 | Murthy et al. |
| 2024/0022403 A1 | 1/2024 | Bandy et al. |
| 2024/0078323 A1 | 3/2024 | Klimov et al. |

OTHER PUBLICATIONS

Notice of Allowance for U.S. Appl. No. 18/418,086, mailed Apr. 10, 2024, 17 pages.

\* cited by examiner

USER ID SELECTION

Please select a user ID, this is to assist you in event that you wish to complete your enrolment in a later date, after your User ID is checked by the system to confirm it is unique and not already existing, you must complete your personal information form, you may immediately follow and complete the assocaited detail or do it at a later time.

USER ID  502

| SMITH 1234 | SUBMIT |

504

Personal information is required for unmistakable identification of you if need arises.

Associated Details:

Allows you to select a password, personal QR Text, and Trusted Phrase. All information provided in Associated form is encrypted within your environment and any information transmitted from your environment to an associated server is encrypted and unidentifiable.

*FIG. 5*

USER INFORMATION FORM

Information you provide on this page will be stored in Administration Server. Keep in mind that any incorrect information may render it impossible to recover input phrases, so please recheck all inputs.

The following information is used to provide unmistakable identification of you if need arises.

FIRST NAME ___602___  MIDDLE NAME ___604___  LAST NAME ___606___

PLACE OF BIRTH:

CITY ___608___  COUNTY/PROVINCE/SHIRE ___610___  STATE ___612___

BIRTHDAY ___614___  BIRTH CERTIFICATE NUMBER ___616___  GENDER ___618___

FATHER FIRST NAME ___620___  MOTHER FIRST NAME ___622___  MOTHER MAIDEN NAME ___624___

SUBMIT ___626___  CLEAR ___628___

UNIQUE INFORMATION FORM

USER ID _702_

SELECT PASSWORD _704_   RE-ENTER PASSWORD _705_

PERSONAL QR TEXT _708_

_706_ This is user 101's first text string. It will have a minimum threshold number of characters.

FILE OR FOLDER? _718_

By admitting this form, you accept us to have an encrypted version of your Trusted Phrase with us.

The QR text you insert into Personal QR Text prompt box is any piece of text, for example a paper article, recipe, instruction, joke, random entry of alphabet, or any other written content. The applicatoin will encapsulate and modify the text for storage as a modified QR text that you may share with others who you desire to serve as backup for obtaining your digital key.

The Trusted Phrase is used by your device for encryption of data element that is kept on our server(s).

TRUSTED PHRASE _712_

_710_ My Book Of health is perfect

SUBMIT _714_   CLEAR _716_   SUBMIT _720_

SYSTEMS AND METHODS FOR DIGITAL DATA MANAGEMENT INCLUDING CREATION OF STORAGE LOCATION WITH STORAGE ACCESS ID

CROSS-REFERENCE TO RELATED APPLICATIONS

This application is a continuation-in-part of U.S. patent application Ser. No. 18/418,086, filed Jan. 19, 2024, which is a continuation-in-part of U.S. patent application Ser. No. 18/385,854, filed Oct. 31, 2023 and which is incorporated by reference herein in its entirety.

BACKGROUND

Token-based authentication is a popular method for application-to-application authentication. Token-based authentication involves verifying the identity of an application by checking a token, which is a symbolic item (piece of data) issued by a trusted source. Tokens may be either physical or digital, and may confirm the identity of a user, requesting Application Programming Interface (API), or another device such as a computer or server. A common token-based authentication method is the use of a JSON Web Token (JWT). JWTs are access tokens that are codes used for authenticating a web application to access specific resources. JWTs may be passed over HTTPs or other secure protocols.

Other types of authentication schemes use physical devices. FOB-based authentication may use a small hardware device that generates a unique code that validates the user and allows them access to a digital asset. Some key FOB-based devices may be small, handheld devices contained in an enclosure that generates the unique code at fixed intervals. Some FOB-based devices may include one or more buttons that transmit specific RFID signals.

Other authentication schemes have become popular as well, including hardware tokens, YubiKey tokens, RSA SecurID tokens, API Keys, OAuth (open standard for authentication) based methods, Digital signatures, challenge-response schemes, as well as others. Cryptocurrency has additionally accelerated the need for secure key management systems. Cryptocurrency is often stored as "tokens" in a "digital wallet." A user accesses the digital wallet using a private key, which may be token-based, or hardware-based.

Some private keys are one-copy-only in that digital copies are not available. This leads to some instances where if the key is lost, then access to the digital wallet is forever lost. Some users will store copies of the private key in a "key vault." Key vaults may be secure storage locations where private keys are stored so they are not forgotten by the key owner.

As cryptocurrency increases in use, so has theft of the private key, and thus access to users' digital wallet(s). In some instances, thefts have occurred from within digital wallet hosting companies, where an internal employee has gained access to the private keys through employment at the digital wallet hosting companies. Other hacks have occurred where key vaults become compromised by hackers thereby leading to theft of the private keys stored in said key vaults.

Many organizations and individuals have records of their operation kept in electronic filing systems and often on server machines run by cloud service provider companies. IN recent times with the introduction of digital assets, record keeping has become more sophisticated. These assets are kept under digital locks. Any lock will have a key, with digital locks being no exception. Their keys are in cryptic form and keeping these keys is not without predicament-loss of the key, forgetting the key, passing on to successors is all an unsolved issue. If lost/forgotten/not passed on, then the data associated with the key may be lost forever. An investor may have multiple keys and keeping track of these keys in a secure manner is a problem not yet resolved.

SUMMARY

The embodiments of the systems and methods herein realize that there exists a need for secure digital key storage. Moreover, there exists a need for recovery of digital keys in situations where the user forgets the digital key, or access to the key vault, or where a user passes away and the digital key must be passed to the user's successor(s). The systems and methods described below solves this problem by creating a multi-party distributed component where, even if one party has only a portion of the secret information (such as userID and login password, or a QR text as described below, or even an encrypted trusted phrase, point-and-pick number or APN, each individual piece of information is not usable in isolation. A trusted phrase known only to the user and at the client device is implemented to function as a controller for accessing all information. Moreover, a sophisticated recovery process enables the trusted phrase to be stored at the administrative server without concern for malicious entities at the administrative server hacking or otherwise reverse engineering the actual trusted phrase from the encrypted trusted phrase.

The below description discusses encrypting and decrypting data. There are two components when encrypting and decrypting data. The first component is the data getting encrypted and the second component is what that first component is getting encrypted with. The second component is typically produced by encryption software and is known as the "key" which usually is based on a phrase provided by a user that is creating the encryption, known as an encryption phrase. There are many encryption protocols in the art, and the embodiments herein may utilize any appropriate encryption protocol. One such encryption protocol is AES-256 as known in the art.

In some aspects, the techniques described herein relate to a method for managing digital information, including: receiving a trusted-phrase text string at a client device; receiving an application pin number (APN) associated with a user; processing the APN to determine a selector value; extracting a portion of the trusted-phrase text string based on the selector value to yield a sub-trusted-phrase text string; generating a storage access ID (SAID), the SAID including the APN and the sub-trusted-phrase-text string encrypted using the trusted-phrase text string as an encryption phrase; and, outputting the SAID to an external device, for creation of a data storage location at a storage server, the data storage location having a name based on the SAID.

In some aspects, the techniques described herein relate to a method, the external device being an application server in communication with the storage server.

In some aspects, the techniques described herein relate to a method, the external device being the storage server.

In some aspects, the techniques described herein relate to a method, further including: after said outputting, receiving login information at the client device; and, in response to authenticating the login information, repeating the steps of receiving the trusted-phrase text string, receiving the APN, processing the APN, extracting the portion of the trusted-phrase text string, and generating the SAID to access the data storage location.

In some aspects, the techniques described herein relate to a method, further including, prior to receiving the trusted-phrase text string, receiving user information and transmitting said user information to an administration server external to the client device for creation of a user profile thereat.

In some aspects, the techniques described herein relate to a method, said user information including a userID and a password.

In some aspects, the techniques described herein relate to a method, further including deleting the trusted-phrase text string from the client device after generation of the SAID.

In some aspects, the techniques described herein relate to a method, the trusted-phrase text string being length-restricted to require a minimum length based at least in part on the APN.

In some aspects, the techniques described herein relate to a method, the processing the APN to determine a selector value including: when the first digit is at or above a first threshold value, selecting the first digit as the selector value; when the first digit below the first threshold value: adding a second digit of the APN to the first digit to yield a current value, comparing the current value to the first threshold value and a second threshold value, when the current value is at or above the first threshold value and below a second threshold value, selected the current value as the selector value, when the current value is at or above the first threshold value and at or above the second threshold value, selecting a maximum value as the selector value, and, when the current value is below the first threshold value, iteratively adding another digit of the APN to modify the current value and repeating the comparing the modified current value to the first threshold value and the second threshold value until the maximum value is selected as the selector value or the current value is selected as the selector value; wherein, during the iteratively adding, if all digits of the selector value are added to the current value and the current value is neither at or above the first threshold value nor below the second threshold value, selecting a minimum value or the maximum value as the selector value.

In some aspects, the techniques described herein relate to a method, further including comparing the SAID to server configuration settings and replacing one or more unusable characters within the SAID with placeholder code.

In some aspects, the techniques described herein relate to a method, further including: receiving another text string at the client device; receiving a point-and-pick value at the client device; obtaining a meaningless phrase based on the another text string and the point-and-pick value; encrypting the trusted-phrase text string using the meaningless phrase as the encryption phrase to yield an encrypted trusted phrase; and, transmitting the encrypted trusted phrase to an external device.

In some aspects, the techniques described herein relate to a method, further including converting the additional text string into a modified text string, the modified text string including one or more of a QR code, barcode, and watermarked image.

In some aspects, the techniques described herein relate to a method, the transmitting the encrypted trusted phrase further including transmitting the point-and-pick value to the external device.

In some aspects, the techniques described herein relate to a method, further including recovering the trusted phrase by: obtaining a recovery text string; obtaining the point-and-pick value and the encrypted trusted phrase from the external device; obtaining a recovery meaningless phrase using the obtained point-and-pick value and the recovery text string; decrypting the encrypted trusted phrase using the recovery meaningless phrase.

In some aspects, the techniques described herein relate to a method, wherein the recovering the trusted phrase is implemented using a recovery module, the method further including accessing the recovery module by: transmitting a recovery request including a first copy of a security code from the recovery module to an administration server; comparing at the administration server, the first copy to a second copy of the security code stored at the administration server; allowing access to the encrypted trusted phrase when the first copy matches the second copy.

In some aspects, the techniques described herein relate to a method, wherein the first copy and the second copy are generated by a signaling device that is an output-only device.

In some aspects, the techniques described herein relate to a method, wherein accessing the recovery module further includes obtaining approval from a threshold number of authorized personnel of the administrative server.

In some aspects, the techniques described herein relate to a method for recovering a trusted phrase text string, including: storing an encrypted trusted phrase text string and a point-and-pick value used to generate the encrypted trusted phrase text string; recovering the trusted phrase text string from the encrypted trusted phrase by: obtaining a recovery text string; obtaining the point-and-pick value and the encrypted trusted phrase; obtaining a recovery meaningless phrase using the obtained point-and-pick value and the recovery text string; decrypting the encrypted trusted phrase using the recovery meaningless phrase to yield the trusted phrase text string.

In some aspects, the techniques described herein relate to a method, wherein the recovering the trusted phrase text string is implemented using a recovery module, the method further including accessing the recovery module by: transmitting a recovery request including a first copy of a security code from the recovery module to an administration server; comparing at the administration server, the first copy to a second copy of the security code stored at the administration server; allowing access to the encrypted trusted phrase when the first copy matches the second copy.

In some aspects, the techniques described herein relate to a method, wherein the first copy and the second copy are generated by a signaling device that is an output-only device.

In some aspects, the techniques described herein relate to a method, wherein accessing the recovery module further includes obtaining approval from a threshold number of authorized personnel of the administrative server.

In some aspects, the techniques described herein relate to a method, the storing the encrypted trusted phrase including: receiving another text string; receiving the point-and-pick value; obtaining a meaningless phrase based on the another text string and the point-and-pick value; encrypting the trusted-phrase text string using the meaningless phrase as the encryption phrase to yield the encrypted trusted phrase; and, transmitting the encrypted trusted phrase to an external device.

In some aspects, the techniques described herein relate to a method, further including converting the additional text string into a modified text string, the modified text string including one or more of a QR code, barcode, and watermarked image.

In some aspects, the techniques described herein relate to a system for managing digital data, including: a client device configured to receive a trusted phrase from a user; an administration server in communication with the client device and storing user profile including: userID, user password, and user biographical information; and, a storage server hosting a storage location for storing digital data for the user; wherein: the storage location is named using a storage access ID (SAID), the SAID includes an APN and a sub-trusted-phrase text string encrypted using the trusted phrase as an encryption phrase, the sub-trusted-phrase text is selected based on the APN, and the trusted phrase is not permanently stored at the client device, the administration server, or the storage server.

BRIEF DESCRIPTION OF THE FIGURES

FIGS. 5-7 depict user interfaces for registering user with the administration server and configuration of one or more user profiles within administration server, in embodiments.

FIG. 14 depicts a user interface used for recovering trusted phrase, in embodiments.

DETAILED DESCRIPTION OF THE EMBODIMENTS

Figure 1:
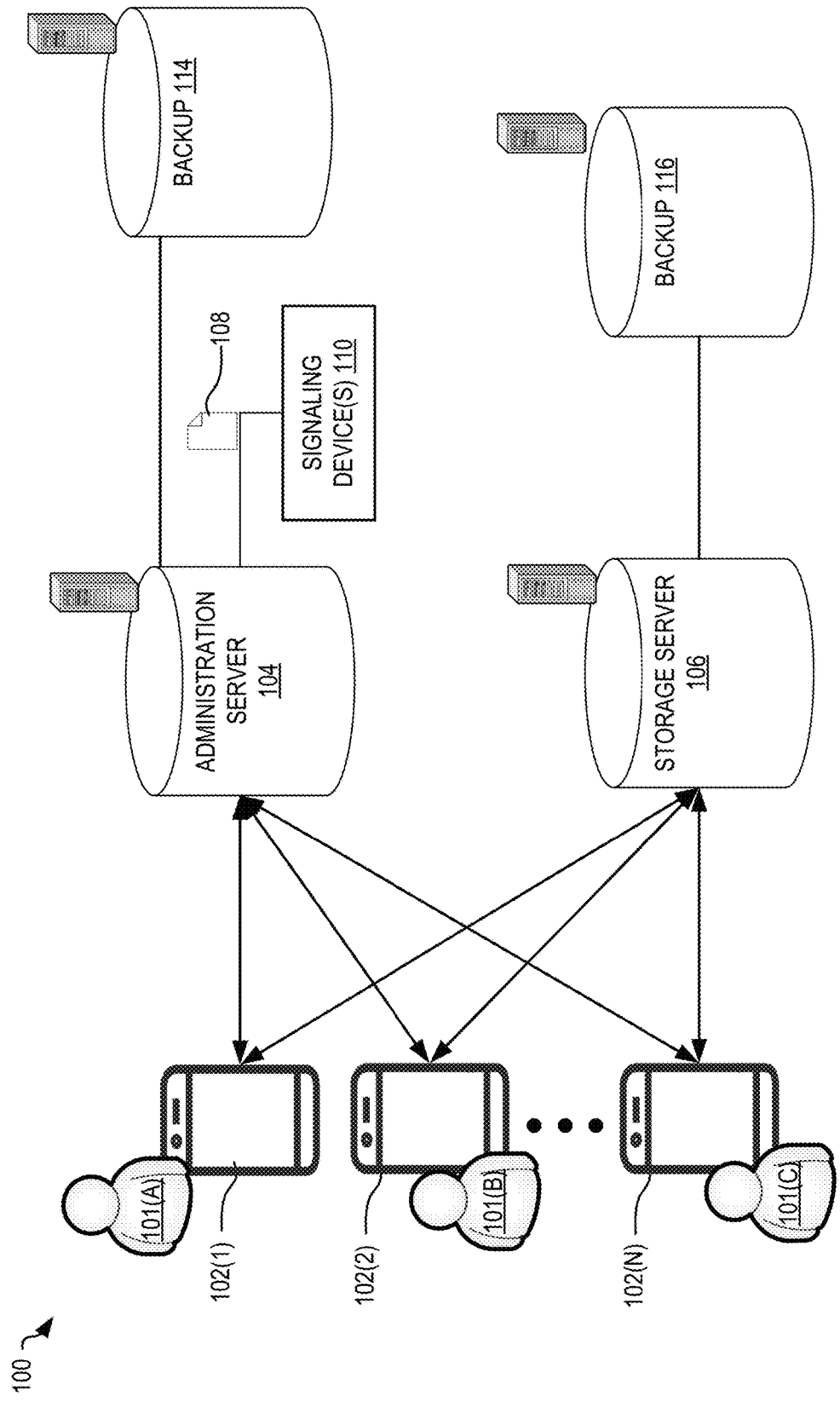
FIG. 1 depicts a system for digital data management, in embodiments.
Figure 2:
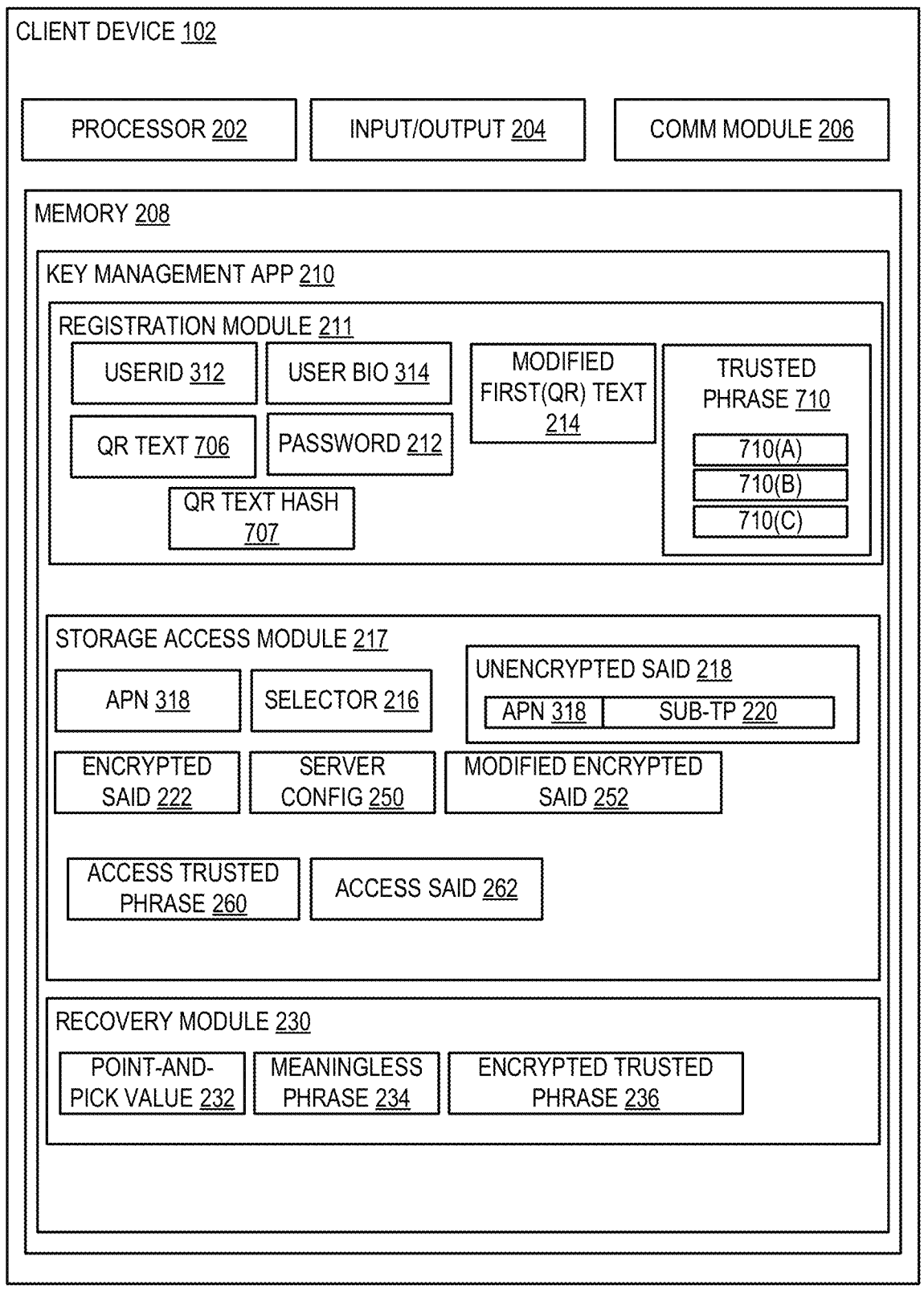
FIG. 2 depicts the client device of the system of FIG. 1, in further detail, in embodiments.
Figure 3:
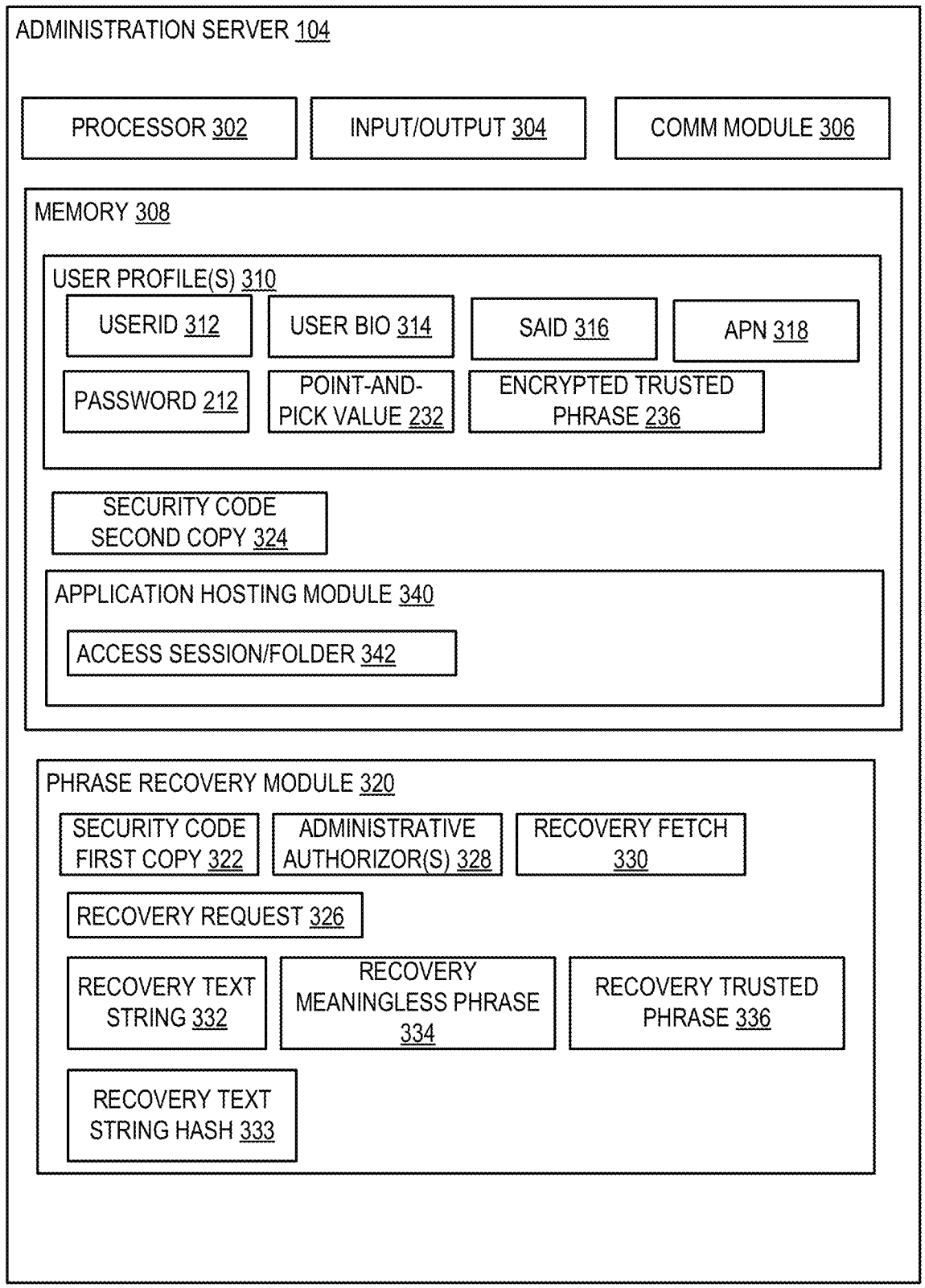
FIG. 3 depicts the administration server of system of FIG. 1 in further detail, in embodiments.
Figure 4:
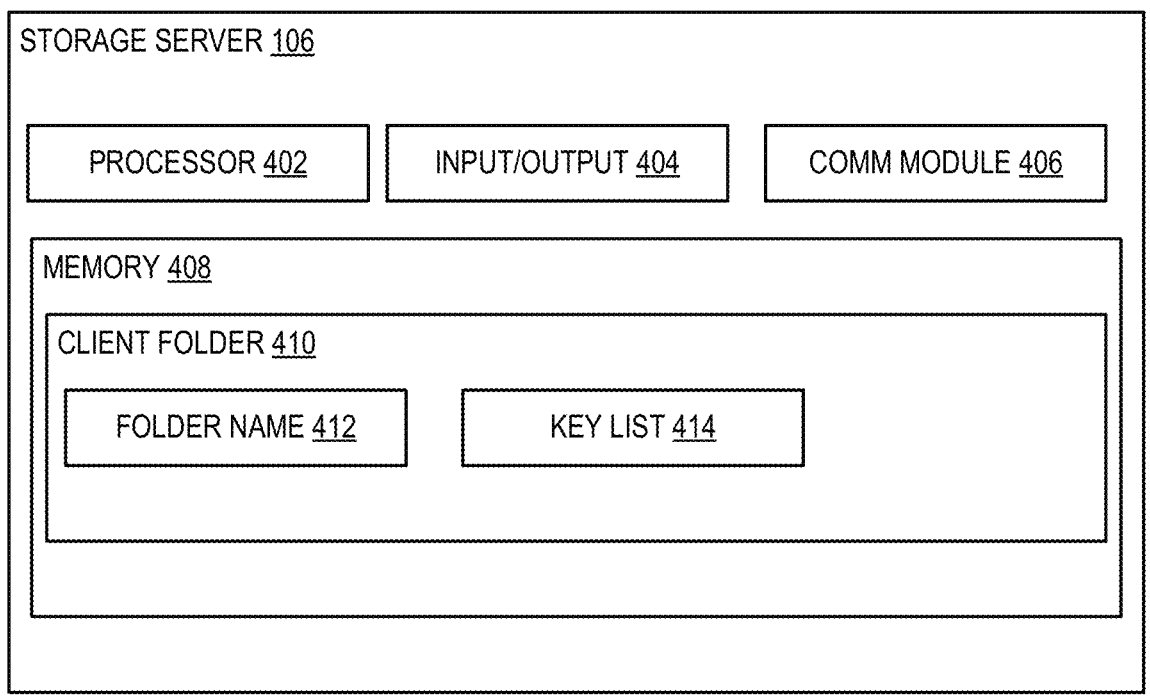
FIG. 4 depicts storage server of system in further detail, in embodiments.

FIG. 1 depicts a system 100 for managing digital keys, in embodiments. FIG. 2 depicts client device 102 of system 100, in further detail, in embodiments. FIG. 3 depicts administration server 104 of system 100 in further detail, in embodiments. FIG. 4 depicts storage server 106 of system 100 in further detail, in embodiments. FIGS. 1-4 are best viewed together with the following description.

In system 100, a user 101, via interaction with a client device 102, interfaces with an administration server 104 and a storage server 106. System 100 is shown with only a single user 101. However, it should be appreciated that each client device 102 may be associated with any one or more user 101 wherein the user 101 access their user-specific information based on their user-specific login details. System 100 is shown with N client devices 102. As such, it should be appreciated that administration server 104 and storage server 106 may interact with any number of client devices 102. Administration server 104 operates to store and process records associated with user 101 and manage user interactions with system 100. Storage server 106 operates to store data and/or data files associated with user 101. Communication (data transfer) between client device 102, administration server 104 and storage server 106 may occur using an Internet Communication Protocol, or via direct communication if hardwired therebetween.

Client device 102 includes one or more of: a processor 202, input and output module 204, a communication module 206, and a memory 208. Processor 202 may include a computing device capable of executing non-transitory computer instructions, such as a microprocessor, chip, circuit, or other known-processing devices such as field-programmable gate arrays that have been programmed to implement the functionality described herein. Processor 202 will also include or be operatively coupled to receive data from or transfer data to, or both, one or more mass storage devices for storing data, e.g., magnetic, magneto optical disks, or optical disks, including, but not limited to, memory 208. However, processor 202 need not have such devices. Input and output module 204 may be a mouse/keyboard, touch screen, microphone/speaker combination, display, or other known input/output device(s), and any combination thereof. Communication module 206 may include any communication transceiver, including wired and/or hardwired protocols, which allows data to be transferred from and received at client device 102. Memory 208 includes computer readable media suitable for storing computer program instructions and data include all forms of nonvolatile memory, media and memory devices, including by way of example semiconductor memory devices, e.g., EPROM, EEPROM, and flash memory devices. The processor 202 and the memory 208, in embodiments, may be supplemented by, or incorporated in, special purpose logic circuitry.

Administration server 104 includes one or more of: a processor 302, input and output module 304, a communication module 306, and a memory 308. Processor 302 may include a computing device capable of executing non-transitory computer instructions, such as a microprocessor, chip, circuit, or other known-processing devices such as field-programmable gate arrays that have been programmed to implement the functionality described herein. Processor 302 will also include or be operatively coupled to receive data from or transfer data to, or both, one or more mass storage devices for storing data, e.g., magnetic, magneto optical disks, or optical disks, including, but not limited to, memory 308. However, processor 302 need not have such devices. Input and output module 304 may be a mouse/keyboard, touch screen, microphone/speaker combination, display, or other known input/output device(s), and any combination thereof. Communication module 306 may include any communication transceiver, including wired and/or hardwired protocols, which allows data to be transferred from and received at administration server 104. Memory 308 includes computer readable media suitable for storing computer program instructions and data include all forms of nonvolatile memory, media and memory devices, including by way of example semiconductor memory devices, e.g., EPROM, EEPROM, and flash memory devices. The processor 302 and the memory 308, in embodiments, may be supplemented by, or incorporated in, special purpose logic circuitry. Administration server 104 may be a cloud-hosted server, or a dedicated server without departing from the scope hereof.

Storage server 106 includes one or more of: a processor 402, input and output module 404, a communication module 406, and a memory 408. Processor 402 may include a computing device capable of executing non-transitory computer instructions, such as a microprocessor, chip, circuit, or other known-processing devices such as field-programmable gate arrays that have been programmed to implement the functionality described herein. Processor 402 will also include or be operatively coupled to receive data from or transfer data to, or both, one or more mass storage devices for storing data, e.g., magnetic, magneto optical disks, or optical disks, including, but not limited to, memory 408. However, processor 402 need not have such devices. Input and output module 404 may be a mouse/keyboard, touch screen, microphone/speaker combination, display, or other known input/output device(s), and any combination thereof. Communication module 406 may include any communication transceiver, including wired and/or hardwired protocols, which allows data to be transferred from and received at administration server 104. Memory 408 includes computer readable media suitable for storing computer program instructions and data include all forms of nonvolatile memory, media and memory devices, including by way of example semiconductor memory devices, e.g., EPROM, EEPROM, and flash memory devices. The processor 402 and the memory 408, in embodiments, may be supplemented by, or incorporated in, special purpose logic circuitry. Storage server 106 may be a cloud-hosted server, or a dedicated server without departing from the scope hereof.

User/Client Device Registration:

User 101 is registered with administration server 104. Client device 102 may include a key management application 210 stored within memory 208. Key management application 210 may be downloaded to client device 102 from an application store, or directly transmitted to client device 102 from administration server 104. User registration may be implemented via a registration module 211 of the key management application 210. Key management application 210 and registration module 211 may be implemented as computer readable instructions that, when executed by the processor 202 operate to cause client device 102 to implement the following functionality.

FIGS. 5-7 depict user interfaces 500, 600, 700, respectively, for registering user 101 with administration server 104 and configuration of one or more user profiles 310 within administration server 104. The user interfaces 500, 600, 700 may be generated by key management application 210 for display on client device 102 using input and output module 204, or another display communicatively coupled to client device 102. User interfaces shown within this disclosure are typically shows as web-based interfaces. However, it should be appreciated that the interface may be displayed via a user application running on a client device, such as key management application 210, or via a web-application without departing from scope hereof.

As shown in user interface 500, user 101 provides a username. The username may be input into prompt box 502, encrypted (using encryption protocols as known to those of ordinary skill in the art) and transmitted to administration server 104 for storage within memory 208 as userID 312. In the example herein, username "SMITH1234" is input into prompt box 502 and the client device 102 may detect user input via detection of user selection of submit button 504. User interface 500 shows additional text that is optional. The additional text may instruct user 101 on how to fill out the form represented by user interface 500. Furthermore, the additional text may include a preview of further information that will be necessary in later forms (e.g., shown as user interfaces 600, 700).

As shown in user interface 600, user 101 next provides biography information. It should be appreciated that some, all, and/or additional information, may be required from, and provided by, user 101 without departing from scope hereof. The biography information shown is an example of the types of biography information usable by system 100. In the example shown in user interface 600, prompt box 602 provides a location for user 101 to input, using input and output module 204, first name of user 101. Prompt box 604 provides a location for user 101 to input, using input and output module 204, middle name of user 101. Prompt box 606 provides a location for user 101 to input, using input and output module 204, last name of user 101. Prompt box 608 provides a location for user 101 to input, using input and output module 204, city of birth of user 101. Prompt box 610 provides a location for user 101 to input, using input and output module 204, County/Province/Shire of birth of user 101. Prompt box 612 provides a location for user 101 to input, using input and output module 204, state of birth of user 101. Prompt box 614 provides a location for user 101 to input, using input and output module 204, birthday of user 101. Prompt box 616 provides a location for user 101 to input, using input and output module 204, birth certificate of user 101. Prompt box 618 provides a location for user 101 to input, using input and output module 204, gender of user 101. Prompt box 620 provides a location for user 101 to input, using input and output module 204, father's first name of user 101. Prompt box 622 provides a location for user 101 to input, using input and output module 204, mother's first name of user 101. Prompt box 604 provides a location for user 101 to input, using input and output module 204, mother's maiden name of user 101. The client device 102 may detect user input to client device 102 via detection of user 101 selecting, using input and output module 204 one of submit button 626 or clear button 628. User interface 600 shows additional text that is optional. The additional text may instruct user 101 on how to fill out the form represented by user interface 600. The user biographic information input into prompt boxes 602-624 is then encrypted (using encryption protocols as known to those of ordinary skill in the art) and transmitted to administration server 104 for storage within memory 208 as user biography information 314.

As shown in user interface 700, user 101 next provides at least three pieces of unique information. First, a password for accessing application 210 is input by user into prompt boxes 704, 705 of user interface 700, as well as, in prompt box 702 of user interface 700, the UserID selected in interface 500.

The second piece of unique information is a first text string 706 (also referred to as a personal Quick Response (QR) text) input into prompt box 708 of user interface 700. First text string 706 may be any text, identified by user 101, such as a cooking recipe, news article, assembly instruction, story, made up text string, or anything. In embodiments, the first text string 706 may not be provided by user 101, but instead is provided by either client device 102 or administration server 104.

In the example shown in FIG. 7, the first text string 706 is "This is user 101's first text string." First text string 706 need not have any particular meaning to user 101. First text string 706 may be length-restricted, such as by requiring at least 300 characters (or more or fewer without departing from scope hereof). System 100 transforms first text string 706 into a unique form yielding modified first text 214 that is stored within memory 208. For example, first text string 706 may be transformed into a QR code, barcode, watermarked image, or some other form.

The third piece of unique information is a second text string 710 (also referred to as a "Trusted Phrase") input by user 101 into prompt box 712 of user interface 700. In the example shown in FIG. 7, the second text string 710 is "My Book Of health is perfect". Trusted Phrase 710 is used by key management application 210 to encrypt data at client device 102 for storage in storage server 106, as discussed in more detail below. Second text string 710 may be of minimum length of 25 characters (or longer or shorter without departing from scope hereof). In embodiments, the minimum length is based at least on the APN, such as the minimum and maximum threshold of the APN discussed below. In embodiments, second text string 710 may also need different types of characters, such as numbers, capital letters and lower case letters, spaces, special characters, etc. User 101 is to remember trusted phrase 710 and keep it secret at all times. Trusted phrase 710 is stored in memory 208 only during registration process for use of generation of unencrypted storage access ID (SAID) 218, encrypted SAID 222 and/or SAID 316 as discussed below. It is then deleted from memory 208 after unencrypted SAID 218, encrypted SAID 222 and/or SAID 316 is generated. In other words, second text string 710 may be stored in a software container while the key management application 210 is running during registration process but is not permanently stored in memory 208.

User interface 700 shows additional text that is optional. The additional text may instruct user 101 on how to fill out the form represented by user interface 700.

The key management application 210 may include data input checking functionality. The data input checking functionality monitors what user 101 is inputting into any of the above-discussed prompt boxes and verifies its format to ensure it is usable by system 100. For example, if first text string 706 needs to be a certain length, the data input checking functionality of key management application 210 may highlight prompt box 708 a first color (e.g., red) until the first text string 706 is of required length in which it changes to a second color (e.g., green) to aid the user 101 in creation of first text string 706 (or other information depending on the given prompt box). Similarly, the key management application 210 may require multiple approvals before accepting information input into prompt boxes by user 101. As an example, user 101 may select submit button 714 to submit information input within prompt boxes of user interface 700 (or clear button 716 to delete information within the prompt boxes of user interface 700). Key management application 210 may require the user to acknowledge that the above information is correct (e.g., in a separate pop-up window) before submit button 714 becomes active.

Registration of Storage Server:

The client device 102 generates encrypted SAID 222, or the administration server 104 and client device 102 collaborate to generate a storage access ID (SAID) 316. To generate the encrypted SAID 222 and/or SAID 316, administration server 104 transmits an application pin number (APN) 318 to client device 102. APN 318 may be generated upon registration of user 101 with administration server 104 (e.g., upon creation of a user profile 310 for the given user 101). APN 318 is stored within the user profile 310 for the given user 101. It should be appreciated that all information within the one or more user profiles 310 is securely stored in encrypted format so that it is not readily accessible to entities associated with the host entity of administration server 104 or storage server 106.

Key management application 210 at client device 102 uses the APN 318 to identify a portion of second text string 710 that will be used to create the SAID 316. In embodiments, the user 101 never sees or accesses APN 318 but instead, APN 318 is transmitted to client device 102, stored in a software container for use in generating SAID 316 (or encrypted SAID 222), and then deleted from the client device 102. In other words, APN 318 is not stored on client device 102, but only used to create a file/folder at storage server 106, or access a file/folder at storage server 106 as discussed below. As such, in some embodiments, APN 318 is transmitted to client device 102 in response to user login using userID 312 and password 212 as discussed below with reference to FIG. 900.

In an embodiment, the APN 318 is a 5 digit number. APN 318 may be a random number, or may be a sequential number based on when the user 101 registered with administration server 104. It should be appreciated that the APN 318 may be more or fewer digits. Key management application 210 uses APN 318 to generate a selector value 216. Selector value 216 may be a value above a predefined threshold. In one example, the predefined threshold is above the value "5". The value of the predefined threshold impacts the length of the SAID 316, as discussed below.

In an embodiment, the APN 318 includes a plurality of sections. A first section of the plurality of sections may be a sequential value (e.g., letter or number) and a second section of the plurality of sections may be a random value. In one embodiment, the APN 318 includes three sections, a first section which is a definer (letter or number) value, a second section which is a sequential value, and a third section which is a random number. For example, APN 318 may be A-00000-234, or B-99999-poin432. In this example, A and B are "definer" section of the plurality of sections; "00000", and "99999" are sequential values of the plurality of sections; and the right-most digits are the random values. In creating the APN 318, by using sequential and definer portion of the plurality of sections, the process is expedited, particularly where server 104 manages a significant number of users. Server 104 ensures that all APNs are checked and no duplicate exists, thus when the sequential number reaches a maximum value, then the definer is triggered to the next sequential value thereof (letter or number). Use of a sequential number and definer sections of the plurality of sections allows efficient operation and response by the server 104 during implementation of registration module 211. Of course, those of ordinary skill in the art would understand that the location of the first, second, and third sections could vary (e.g., the random section is first, and the definer section is section, and the numerical section is third), or any other combination of plurality of sections could be implemented without departing from scope hereof.

Figure 8:
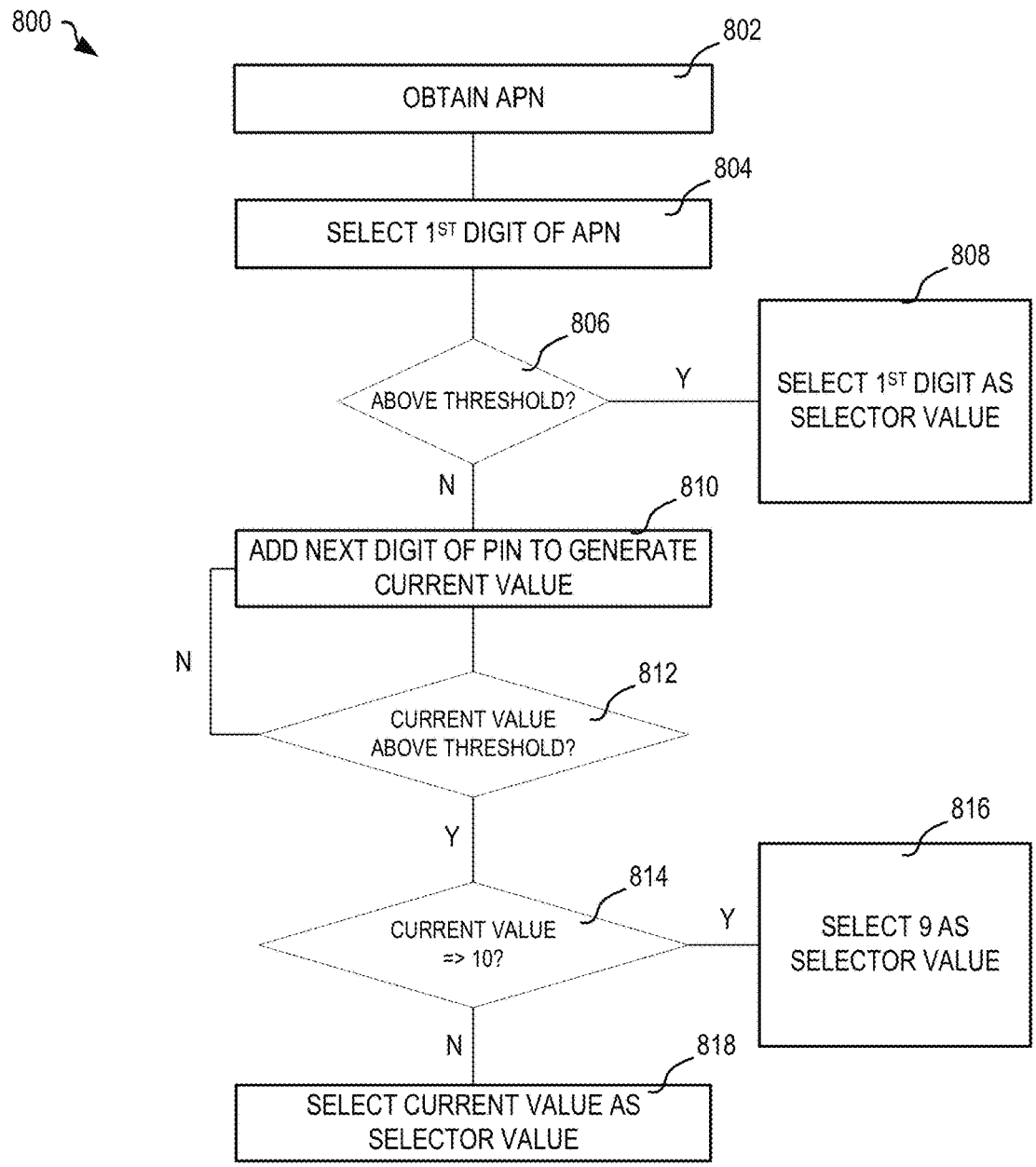
FIG. 8 shows a method for generating selector value, in embodiments.

FIG. 8 shows a method 800 for generating selector value 216. Method 800 is implemented by processor 202 executing the computer instructions of key management application 210, for example. Method 800 may be implemented each time user 101 logs into key management application 210 on client device 102, in response to client device 102 receiving APN 318 after logging into the key management application 210. Method 800 may be implemented using a storage access module 217 of key management application 210. Storage access module 217 may be computer readable instructions that, when executed by the processor 202 operate to implement the following functionality associated with creating and accessing (reading/writing) a file/folder at storage server 106.

In block 802, an APN is obtained. In one example of block 802, APN 318 is transmitted from administration server 104 to client device 102 and stored in memory 208. APN 318 stored in memory 208 (or within a software container at client device 102) is then retrieved for use in method 800.

In block 804, a first digit of the APN is selected. In one example of block 804, the right-most digit of APN 318 is selected. In another example of block 804, the left-most digit of APN 318 is selected.

In block 806, it is determined if the selected $1^{st}$ digit in block 804 is above a predefined threshold. In one example of block 806, the predefined threshold is "5". This works particularly well where the second text string 710 is 25 characters long. If the $1^{st}$ digit selected in block 806 is above the predefined threshold, then in block 808, the $1^{st}$ digit is assigned as the selector value 216. Else, method 800 proceeds with block 810.

In block 810, the adjacent digit to the $1^{st}$ selected digit in block 804 is added to the $1^{st}$ selected digit to yield a current value.

In block 812, it is determined if the current value is above the first predefined threshold. If no, then block 810 is repeated with the next adjacent digit of the APN. This iteratively repeats until the summed current value is above the predefined threshold, in which block 814 is executed.

In block 814, it is determined if the current value is greater than or equal to a second predefined threshold (such as but not limited to 10). If yes, then method 800 selects "9" as the selector value 216 in block 816. In embodiments, if the selector value is able to be more than a single digit, then the current value may be used in block 816 instead of selecting "9." If, in block 814, it is determined that the current value is less than 10, then the current value is selected as the selector value 216 in block 818.

Blocks 810-814 iteratively repeat for additional digits of the APN until the conditions defined by the first and second predefined thresholds are satisfied. If, after all digits of the APN are added to the current value, and the current value is neither at or above the first threshold value nor below the second threshold value, selecting a minimum value or the maximum value as the selector value 216.

The following table provides examples and explanation of how the selector value was chosen in accordance with method 800, with the predefined threshold being chosen as "5".

TABLE 1

Selector Value Examples

| APN | Selector Value | Explanation |
| --- | --- | --- |
| Example 1 | 11116 | 6 | First right-most digit is 6; so, selector value = 6 (block 808) |
| Example 2 | 11902 | 9 | First right-most digit is 2, next digit is 0, third digit is 9, which equals 11; so, selector value = 9 (block 816) |
| Example 3 | 11111 | 5 | First right-most digit is 1, next digit is 1, third digit is 1, fourth digit is 1, fifth digit is 1 which equals 5; so, selector value = 5 (block 818) |
| Example 4 | 11161 | 7 | First right-most digit is 1, next digit is 6, which equals 7; so, selector value = 7 (block 818) |

TABLE 1-continued

Selector Value Examples

| APN | Selector Value | Explanation |
| --- | --- | --- |
| Example 5 | 11122 | 5 | First right-most digit is 2, next digit is 2, third digit is 1, which equals 5; so, selector value = 5 (block 818) |
| Example 6 | 11011 | 5 | First right-most digit is 1, next digit is 1, third digit is 1, fourth digit is 0, fifth digit is 1 which equals 4; so, selector value = 5 (all APN digits summed and still below 5, so select threshold as selector value) |

Selector value 216 may be generated by other methods without departing from the scope hereof. For example, the selector value 216 may be generated using a characteristic of the trusted phrase 710 (or the QR text 706, or even another input text string or number from user 101). The length of the trusted phrase 710 (or the QR text 706, or even another input text string or number from user 101) is halved until the result is within the predetermined threshold. Similar to the above example of method 800, the predetermined threshold may be equal to or above "5" and less than 10, but other thresholds may be used without departing from scope hereof. At each iteration, or at the final iteration indicating a value within the predetermined threshold, the value may be selected or rounded up or down to the nearest whole number. For example, if the trusted phrase length is 25, the first halving iteration results in 12.5, and the second halving iteration results in a value of 6.25. The value "6.25" is within the predetermined threshold of 5 to 9, and thus the selector value 216 could be selected up as 7, or down as 6 depending on the settings of the selector value 216 selection algorithm. Similarly, if the trusted phrase length is 32, the first halving iteration results in a value of 16, and the second halving iteration results in a value of 8 with no rounding needed. Use of the length of trusted phrase as selector value 216 improves security because the trusted phrase isn't known to potential hackers or malicious entities at administration server 104. Thus, the client device 102 only knows the selector value and no APN 318 from administration server 104 is needed.

After generation of selector value 216, storage access module 217 uses selector value 216 to process second text string 710 to yield an unencrypted SAID 218 by appending the APN 318 to a sub-portion text string 220 of the second text string 710. In the above examples, where second text string 710 is "My Book Of health is perfect", and selector value 216 is 7 (e.g., example 4 in table 1 above), then sub-portion text string 220 is "Of hea" (the 7 characters after the 7th character in the second text string 710). Notably, the $1^{st}$ character is a space. In embodiments, the unencrypted SAID 218 then includes "11161" appended to "Of hea", which results in unencrypted SAID 218 of "11161 Of hea".

Storage access module 217 then encrypts the unencrypted SAID 218 using the entire trusted phrase 710 as the encryption phrase, to yield encrypted SAID 222. In one embodiment, the encrypted SAID 222 is transmitted to administration server 104 for storage as SAID 316. Thus, the SAID 316 is not decipherable without the Trusted Phrase 710. However, in certain embodiments, administration server 104 never receives SAID 316. Instead, client device 102 uses encrypted SAID 222 to implement any functionality described herein associated with administration server 104 utilizing SAID 316 to create/access a file/folder within storage server 106.

Thus, in one embodiment, administration server 104 acts as an intermediary to establish a client folder 410 at storage server 106 by transmitting the SAID 316 to the storage server 106. The storage server 106 creates the client folder 410 having a folder name 412 based on the encrypted information within SAID 316 such that the folder 410, by itself, has no identifying information. The storage server 106 may then delete SAID 316 such that client folder 410 at storage server 106 is not attributable to a given user 101 based on the file name of 410 being located at administration server 104 (e.g., within user profile 310). This three-party system, e.g., the client device 102 having the only actual implementation of the second text string 710 (that is never permanently stored, but only used during creation of encrypted SAID 222), administration server 104 having the SAID 316 (and never receiving first text string 706 or the unencrypted version of second text string 710), and storage server 106 having client folder 410, creates an environment where the information within storage server 106 is inaccessible to anyone at administration server 104. As such, employees of administration server 104 are not able to obtain or leak sensitive information about user 101. Moreover, anyone hacking storage server 106 obtains useless information because all they see is encrypted data based on SAID 316.

In another embodiment, client device 102 communicates with storage server 106 to establish a client folder 410 at storage server 106 by transmitting the encrypted SAID 222 to the storage server 106. The storage server 106 creates the client folder 410 having a folder name 412 based on the encrypted information within encrypted SAID 222 such that the folder 410, by itself, has no identifying information. This system, e.g., the client device 102 having the only actual implementation of the second text string 710 (that is never permanently stored, but only used during creation of encrypted SAID 222) and storage server 106 having client folder 410, creates an environment where the information within storage server 106 is inaccessible to anyone at administration server 104. As such, employees of administration server 104 are not able to obtain or leak sensitive information about user 101. Moreover, anyone hacking storage server 106 obtains useless information because all they see is encrypted data based on encrypted SAID 222.

Certain storage server 106 may have restrictions on the characters usable in creation of files/folders at that storage server 106. Accordingly, storage access module 217 (or administration server 104) may include name-change functionality implemented as computer-readable instructions that, when executed by processor 202 (or processor 302) operate according to the following. Storage access module 217 may analyze the encrypted SAID 222 against one or more server configuration settings 250. One or more server configuration settings 250 includes a list of unusable characters when naming a file on one or more servers. Storage access module 217 has knowledge of where the client folder 410 is being created (e.g., the location and host of storage server 106, including the unusable characters thereat). If the generated encrypted SAID 222 includes unusable characters as defined by one or more server configuration settings 250, then storage access module 217 may modify encrypted SAID 222 by replacing each unusable character with a placeholder "code" (e.g., placeholder character or set of characters) wherein the placeholder code includes only characters that are acceptable by the given storage server 106. Storage access module 217 may receive periodic updates of one or more server configuration settings 250. The above-described name-change functionality may be implemented at administration server 104 without departing from scope hereof, by modifying any unusable characters within SAID 316 with the above-discussed placeholder codes. MOreover, this name-change functionality may be implemented any time encrypted SAID 222 or SAID 316 is generated, or client folder 410 is accessed.

In embodiments, every time user 101 logs into key management application 210, the process of 800 may be implemented such that the data of client folder 410 may change each time the user 101 reads/writes from client folder 410. In other words, as the user 101 modifies data to be stored within client folder 410, a new trusted phrase may be entered. This may be the same every time (in which case the SAID 316 in one or more user profiles 310 need not be updated), or it may be different each time the user 101 logs in. Moreover, the user 101 may change their Trusted Phrase, thereby allowing the user 101 peace of mind in that the Trusted Phrase is frequently changed. Lastly, because the trusted phrase (e.g., second text string 710) is not stored (unless encrypted) on either client device 102, administration server 104 or storage server 106, an additional level of security is presented. The SAID 316 is different than the userID 312 and password 212 discussed above with respect to user interface 500. Thus, even if a hacker breaks into the key management application 210 on client device 102, they don't get access to client folder 410. This is because access to client folder 410 requires the trusted phrase, which is not stored anywhere on client device 102.

After user-registration, the user profile 310 is established at administration server 104. At this point, only the userID 312, user biographical information 314, and SAID 316 is located at the administration server 104; neither the first text string 706, modified first text 214, nor second text string 710 are stored at administration server 104. This provides the advantage that the critical information used to access data records within system 100 is known only to the user 101 and located only at client device 102. While information in one or more user profiles 310 is used by the system 100 to access user's data, the information is by itself useless. This provides security advantages in that even internal employees of the entity managing administration server 104 are not able to hack and leak user data. Moreover, because data within administration server 104 is not independently useable, it may be backed up in backup server 114 without concern of an additional data breach point.

Data Read/Write into Storage Server:

The user 101 may use client folder 410 as a location to store sensitive data. The data stored may be a "folder" service if the user 101 desires to keep documentations, such as but not limited to a will or other form of valuable documentation. The data stored may be a "file" service if user 101 desires to store a file that the user keeps notes and phrases, such as crypto keys. The below mostly discusses on file service, but it should be appreciated that any data stored on storage server 106 may be a file or a folder (whether referenced herein as "file" or "folder"), or any type of data that is encryptable using trusted phrase process discussed herein. References to a "file" or "folder" may also be referred to as a data storage location herein. The user 101 may be able to select the desired service type (e.g., folder service versus file service) using a drop-down selection during registration. One example drop-down is file/folder selector 718, shown in FIG. 7.

Figure 9:
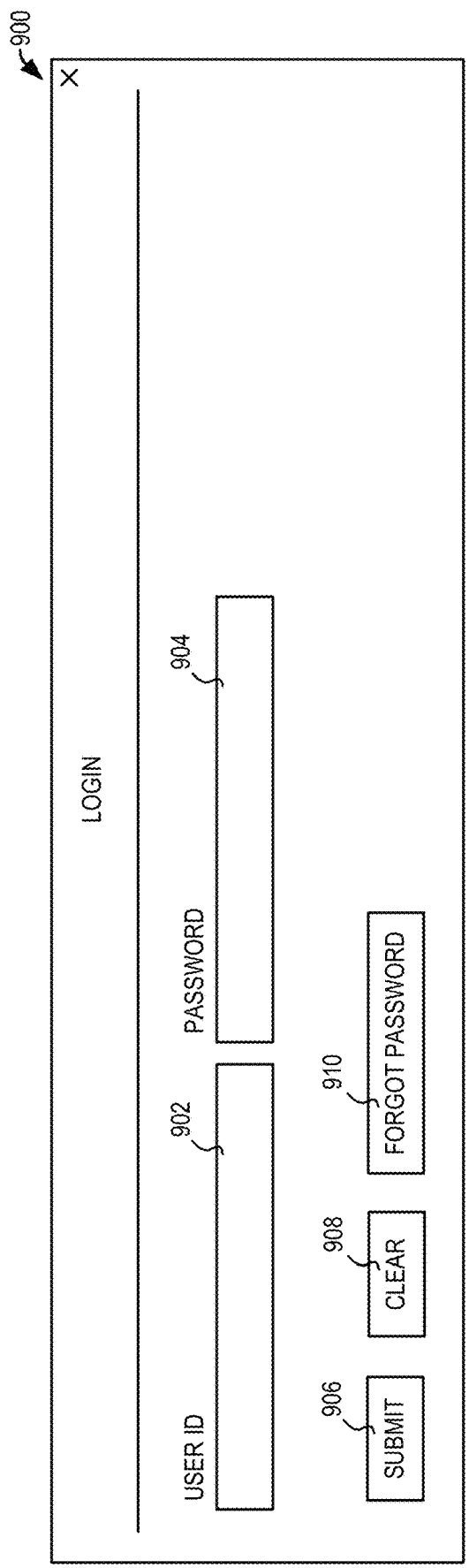
FIG. 9 shows a user interface of a login screen, in embodiments.

To store data on storage server 106, the user 101 logs into 210. FIG. 9 shows a user interface 900 of a login screen, in embodiments. User 101 must enter a userID into prompt box 902, and a password into prompt box 904. These are then compared to user profile 310 at administration server 104 (or used via any known ID and password-based authentication process) to allow access to key management application 210. Submit button 906 and clear button 908 operate to submit and delete, respectively, inputs within prompt boxes 902, 904. Advantageously, because login to key management application 210 does not, by itself, provide access to information at storage server 106, a known process for "forgot my password" may be implemented to recover userID 312 and password 212. Known "forgot my password" functionality is allowed because to access the specific data within storage server 106, the user 101 must input the trusted phrase previously input to generate the SAID 316 and encrypt the data within storage server 106.

As described above, administration server 104 instructs storage server 106 to create client folder 410 having folder name 412 based on SAID 316. It should be appreciated that client device 102 may directly instruct storage server 106 to create client folder 410 having folder name 412 based on SAID 316 (or based on encrypted SAID 222, which is the same as SAID 316). Moreover, client device 102 directly stores information within client folder 410 and encrypted using the Trusted Phrase 710 as the encryption phrase for encrypting the data.

To access (both read and write) the data file within storage server 106, user 101 inputs, using input and output module 204 of client device 102, the trusted phrase. Client device 102 then obtains the APN 318 from the server or from internal memory 208 at the client device 102 through the logged-in client application 210, recreates the SAID 222 (or transmits a request for, and in response receives, the previously generated SAID 316 from the administration server 104). Client device 102 transmits the recreated SAID 222 (or, in some embodiments, the previously generated SAID 316 from the administration server 104) to the storage server storage server 106. Storage server 106 then compares the recreated SAID 222 (or the previously generated SAID 316 from the administration server 104) to the client folder name 412, which was created based on SAID 316, to grant access to the data in the client folder 410.

If the recreated SAID does not match the previously generated SAID used to create the client folder 410 on storage server 106, then the access request may be denied. If a given device attempts to access multiple times within a given time frame, and is denied each time, said device may be locked-out, or otherwise barred from accessing storage server 106 or other features within storage access module 217 for a given period. Future access to the application 217 may also require user 101 to request access from a system administrator to unlock the storage access module 217.

Figure 10:
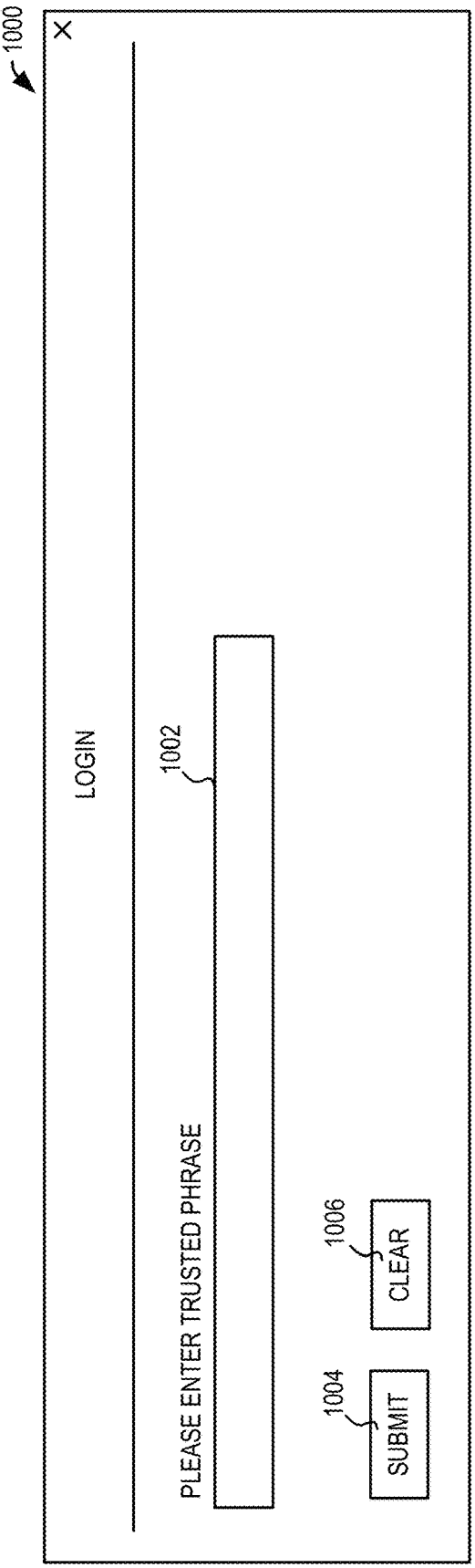
FIG. 10 shows an example user interface for entering the trusted phrase to gain access to client folder at storage server, in embodiments.

FIG. 10 shows an example user interface 1000 for entering the trusted phrase to gain access to client folder 410 at storage server 106, in embodiments. User interface 1000 may be presented at client device 102 in response to successful entry of UserID and Password in user interface 900. User interface 1000 includes a trusted phrase prompt box 1002, submit button 1004, and clear button 1006. User interface 1000 may further include an "update trusted phrase" button 1008. Button 1008 may be used if the user 101 desires to change the trusted phrase previously entered during registration of user 101 with administration server 104. In response to selection of 1008, information within storage server 106 associated with user 101, such as user profile 310 is marked for update. The client device 102 may present another interface for entering a new trusted phrase (such as a new presentation of user interface 700 having an "update" button 720 that, when selected, utilizes new information within prompt box 708 as the updated second text string 710). In such instance, the information relying on second text string 710 discussed herein may be updated using the newly-entered trusted phrase received in response to selection of button 1008. Such updated information includes, unencrypted SAID 218, encrypted SAID 222, SAID 316, and/or encrypted trusted phrase 236. Furthermore, the client folder 410 may be updated to reflect a new folder name 412 based on the updated trusted phrase.

Figure 11:
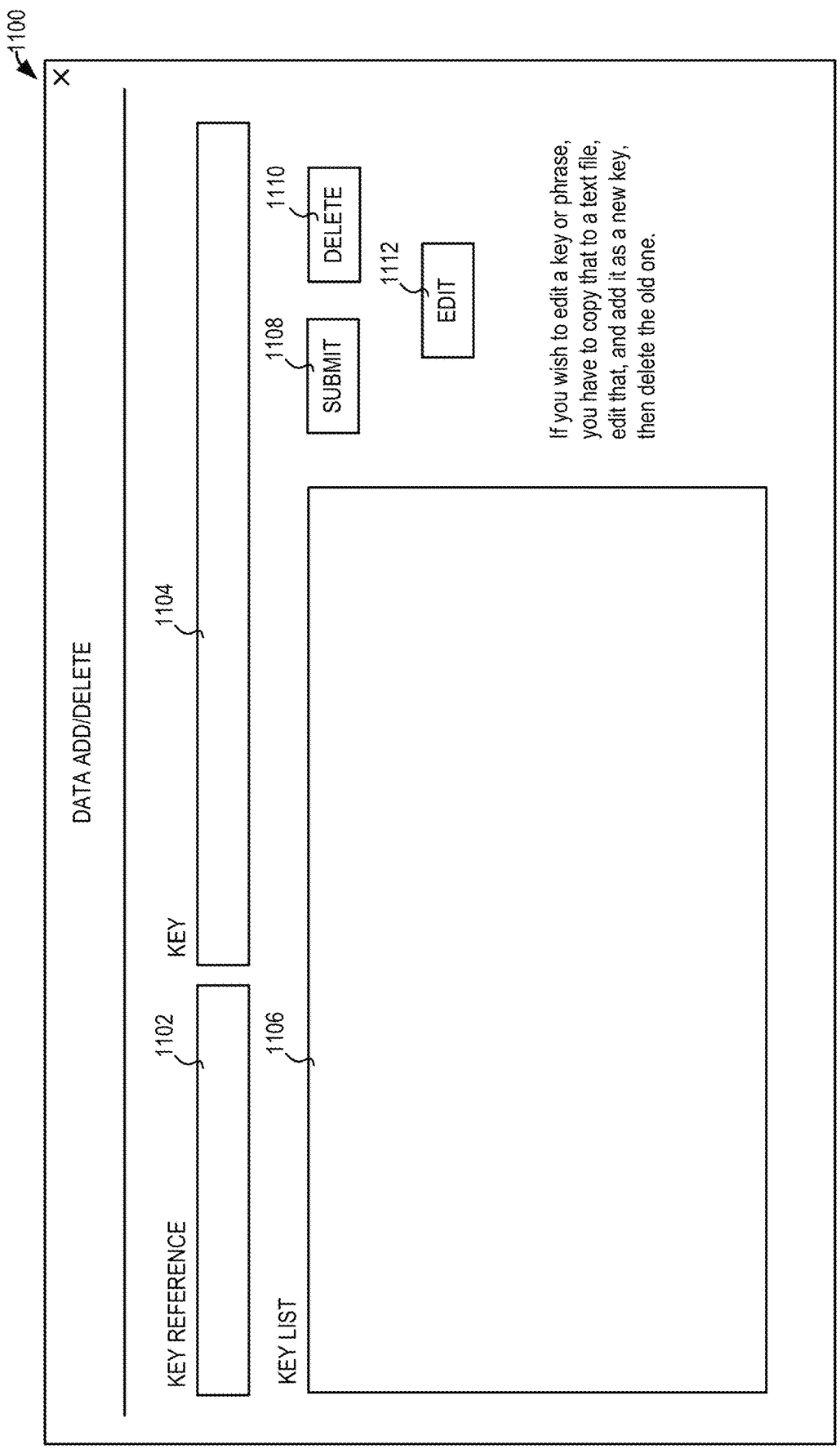
FIG. 11 depicts user interface for adding and deleting prior keys, in embodiments.

FIG. 11 depicts user interface 1100 for adding and deleting prior keys, in embodiments. User interface 1100 includes a key reference prompt box 1102, key prompt box 1104, and prior key list display portion 1106. User 101 inputs, using input and output module 204 of client device 102, a key reference into prompt box 1102. Key reference is a name or reference identifier of what the key is used for. User 101 inputs, using input and output module 204 of client device 102, a key into prompt box 1104. The key may be an access identifier for the given reference. For example, key reference may be a bank name, and the key is access detail of a safety deposit box. As another example, the key reference is a safety deposit box, and the key is instruction on how to open the safety deposit box and its COD. As another example, the key reference is a digital wallet name and the key is the key to the digital wallet. As another example, the key reference is a hidden location, and the key is an instruction to find the hidden location. The examples above are non-limiting. Thus, the data within client folder 410 need not be specific to digital wallets but may be any type of digital data. Prior key list display portion 1106 indicates which keys were previously stored within client folder 410 as key list 414, in FIG. 4. Prior key list display portion 1106 may not be manipulatable. In the alternative, prior key list display portion 1106 may be manipulatable in which the key list 414 is updated against prior inputs. Where prior key list display portion 1106 is not manipulatable, user 101 may be required to delete a given key/key reference within key list 414 (shown in prior key list display portion 1106) using delete button 1110, and enter a new key reference and key, using prompt boxes 1102 and 1104, respectively, with the updated information using submit button 1108. Additionally or alternatively, an edit button 1112 may allow user 101 to manipulate the information shown in prior key list display portion 1106 and click "edit", in which key management application 210 encrypt the updated information within prior key list display portion 1106 and transmit to storage server 106 for storage within client folder 410. As the user 101 enters new key references and keys, using prompt boxes 1102 and 1104, respectively, they may be encrypted using trusted phrase entered via user interface 1000 (or a new trusted phrase if the user desires to use a new trusted phrase), and transmitted to, and stored by, storage server 106 as a portion of key list 414. Thus, key list 414 represents either a bulk list of each key reference/key pair, or individual ones of each key reference/key pair.

As discussed above, all data stored within client folder 410 is encrypted using the secret Trusted Phrase and as such, the trusted phrase serves as a controller for user data management. Because the client folder 410 at the storage server 106 is entirely encrypted using the trusted phrase, even if the SAID 316 is presented to the storage server 106, it is useless because the trusted phrase is needed to decrypt all information within client folder 410 at the storage server 106. Advantageously, this prevents internal hacking from internal to the entity or entities running administration server 104, or storage server 106. Moreover, because data within storage server 106 is not independently useable, it may be backed up in backup server 116 without concern of an additional data breach point.

Multi-Part Trusted Phrase

The above discussion references a single trusted phrase (e.g., second text string 710) to generate encrypted SAID 222, SAID 316, and encrypt data for storage within client folder 410. However, in certain embodiments, an entity associated with user 101 may not want user 101 to have full control over the client folder 410, but instead want a plurality of users to collaborate together in order to access client folder 410. In such instances, a given second text string 710 used to generate encrypted SAID 222, SAID 316, and encrypt data for storage within client folder 410 may include a plurality of second text string portions for each user. For example, if there are three users (e.g., 101(1), 101(2), and 101(3)) required to access a given client folder 410, there would be three sub-portions 710(1), 710(2), 710(3) of second text string 710, each sub-portion being associated with a respective one of the users.

To access (both read and write) the data file within a client folder 410 at storage server 106, a first user (e.g., user 101(1)) inputs, using input and output module 204 of client device 102(1), the first user's respective sub-portion of trusted phrase (e.g. 710(1)). Client device 102(1) then obtains the APN 318, or a sub-portion of APN 318 associated with the sub-portion of trusted phrase 710(1) from the server 104 or from internal memory 208 at the client device 102(1) through the logged-in client application 210. User device 102(1) then recreates a sub-portion (222(1)) of SAID 222 (or transmits a request for, and in response receives, a previously generated sub-portion (316(1)) of SAID 316 from the administration server 104). Client device 102(1) transmits its respective sub-portion (222(1)) of the recreated SAID 222 (or, in some embodiments, the previously generated sub-portion (316(1)) SAID 316 from the administration server 104) to the storage server storage server 106. Storage server 106 may wait to grant access to the associated client folder 410 until each sub-portion 222(2), 222(3) (or 316(2), 316(3)) are received from the respective additional user devices 102(1), 102(3), thereby receiving the full SAID 222, or 316 associated with the multi-portion trusted phrase.

In instances where storage server 106 hasn't received a respective portion of the SAID from one or more of the users required to provide a respective trusted phrase (or sub-portion thereof) to access a given folder 410, the storage server 106 may transmit a prompt to the client device 102 associated with the missing portion of the SAID. Alternatively, the storage server 106 may transmit a message to the administration server 104, which triggers administration server 104 to transmit a message to client device 102 requesting a trusted phrase or portion thereof to access the given folder 410. Access to client folder 410 is not given to any of users 101(1)-101(3) until each respective user gives their respective trusted phrase sub-portion.

Recoverable Trusted Phrase:

Certain embodiments herein may include functionality to recover the trusted phrase. One advantage of the system 100 discussed above is that only the user 101 knows the trusted phrase 710, the trusted phrase is never permanently stored within client device 102, administration server 104, or storage server 106, but instead only temporarily stored to generate encrypted SAID 222, SAID 316, and encrypt data for storage within client folder 410. However, the systems and methods described herein realize that people forget the trusted phrase, lose the keys, or even pass away such that they can't recover keys/data because the trusted phrase is unknown. The following disclosure, which may be implemented by system 100 independently and/or in conjunction with the above disclosure, allows a pathway for recovery of a trusted phrase without allowing malicious entities, either hackers or internal personnel to the entities hosting administration server 104 or storage server 106, access to the underlying data within storage server 106 or the trusted phrase itself.

The following process may be implemented using an administration-server phrase recovery module 320 of administration server 104 (or another server, such as a separate recovery server) and a client-device phrase recovery module 230 on the client device 102. Phrase recovery module 320 may be computer readable instructions that, when executed by processor 302, or a separate processor/memory not associated with the processor 302 and memory 308 that operate to implement the phrase recovery functionality performed by administration server 104 as described below. It should be appreciated that application-server phrase recovery module 320 may be restricted as it may be an independent software functionality operating within administration server 104. Alternatively, phrase recovery module 320 may operate using entirely different hardware from administration server 104 used to implement the above-described functionality. If the recovery module 320 is implemented on administration server 104, then administration server 104 may also be referred to as a "recovery server"; alternatively, the recovery server that is in communication with, but not the same as administration server 104. In instances where recovery server is separate from administration server 104, the recovery server may access necessary data to implement the functionality thereof from administration server 104, and delete the data after the functionality is completed. As such, the phrase recovery may provide that any person requesting recovery of the trusted phrase must be the proven owner or legally allowed to make such a request (e.g., a proven legal successor, or authorized person from the legal owner). Client-device phrase recovery module 230 may be computer readable instructions that, when executed by processor 202 operate to implement the phrase recovery functionality performed by client device 102 described below.

As discussed above, during registration of user 101, user 101 inputs a first text string 706 into client device 102. This first text string 706 may be referred to as a "QR text" because it can be converted to modified first text 214 in the form of a QR code. Other than a QR code, modified first text 214 may be a barcode, watermarked image, or some other form. The first text string 706 need not be any particularly special data, other than a text string. It may be a newspaper article, recipe, advertisement, instruction, collection of meaningless words, etc. Alternatively, first text string 706, or modified first text 214 are not stored within memory 208 on client device 102, but instead stored within memory 308 on administration server 104.

The user 101 should keep it as a printout, file, or in the case of modified first text 214 a QR printout. In certain embodiments, modified first text 214 is embodied in a keychain, or other physical form that may be given to user 101 family, lawyer, friend, trustee, etc. Because the first text string 706 and resulting modified first text 214 are not usable alone, there is minimal concern if first text string 706 or modified first text 214 are obtained by someone not authorized by user 101.

As discussed above, the first text string 706, or modified first text 214 alternatively are not stored within memory 208 on client device 102, but instead stored within memory 308 on administration server 104. In such alternative embodiments, a point-and-pick value 232, as discussed below may be embodied in a keychain, or printed on a document such as a will, or other physical form that may be given to user 101 family, lawyer, friend, trustee, etc.

To achieve trusted phrase recovery, however, the trusted phrase must be recoverable from some storage location. As discussed above, it is undesirable to keep extremely sensitive information readily available in either client device 102, administration server 104 or storage server 106. As the trusted phrase (second text string 710) is the controller of the security of system 100, this information is the most sensitive of the security measures implemented by system 100 (e.g., including the four levels of security of userID 312, password 212, SAID 316, and second text string 710).

Encryption of the Trusted Phrase for Later Recovery Thereof:

Thus, after completing the required sign-on with user ID 312, password 212 and biographic information provided by the user 101, the systems and methods herein require the user 101 to provide a string (a piece of text) referenced herein as Trusted Phrase (TP) 710, the system then generates a temporary software object using a Defined Method (DM), referred to below as the Meaningless Phrase (MP). The MP is used for Encrypting the TP 710 to an encrypted trusted phrase (ETP), the MP is then deleted and not stored. The MP could be regenerated using the DM to retrieve the user's TP if when required. Thus, client-device phrase recovery module 230 utilizes a point and pick (PP) value and a Meaningless Phrase (MLP) as discussed below to sufficiently encrypt the trusted phrase (second text string 710) for storage at administration server 104.

In examples discussed below, the meaningless phrase generation is accomplished by using a combination of Point-and-Pick (PP) number and the First Text (QR Text), which are also referred to herein as segment values. However, it may be modified so that each segment value is kept by one entity, provider, user, administrator, or the like in such that two segment values are never together unless deemed necessary. Due to the nature of the below method for generating the meaningless phrase, it is not important which entity, provider, user, administrator, or the like, holds which segment value. Of note, a "User" as described herein, could be a person, organization, business, or machine. This is because each segment value kept by each entity by itself has no meaning, value, or use. However, once combined, these segment values could recreate the meaningless phrase as discussed below to decrypt the encrypted trusted phrase to obtain the trusted phrase. The entity maintaining each segment value has no relevance and such segment values could be text, numbers, image, etc. For example, the first text string 706 (QR Text) could be generated and/or stored by the administration server 104, and the user 101 and/or client device 102 could generate/store the point-and-pick values discussed herein, or vice versa. Additionally, any entity (e.g., the administration server 104 or the client device 102 or a combination thereof) may generate the given segment value, such as the first text string 706 and/or point-and-pick value. For example, the client device 102 may receive the first text string 706 from the user 101 via interaction with the client device 102, and the client device 102 may also generate the point-and-pick value. Afterwords, one of the first text string 706 and the point-and-pick value may be implemented as a modified string (e.g., modified first text 214), converted into physical form as a keychain, or printed on a document (like will), or other physical form that may be given to user 101 family, lawyer, friend, trustee, etc., and then useable for recreation of the trusted phrase as discussed below. The other of the first text string 706 and the point-and-pick value maybe transmitted to administration server 104 for secure storage thereof. The method described in the current disclosure of the patent follows this process and could be used as an example.

Figure 12:
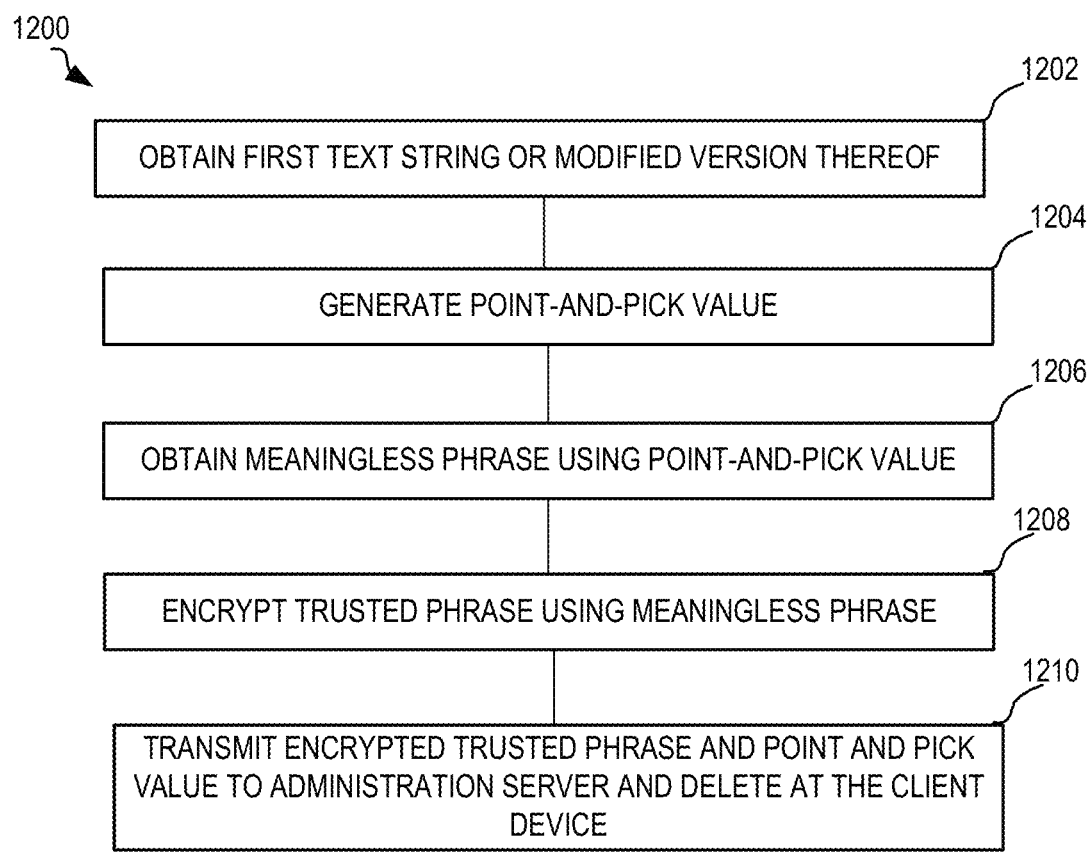
FIG. 12 depicts a method for encrypting a trusted phrase for later recovery, in embodiments.

FIG. 12 depicts a method 1200 for encrypting a trusted phrase for later recovery, in embodiments. Method 1200 may be performed using client-device phrase recovery module 230.

At block 1202, method 1200 obtains a QR text. In one example of block 1202, user interface 700 is utilized to obtain first text string 706 from user 101 interacting with client device 102. As another example, the first text string 706 is randomly generated by client device 102. The first text string 706 is then stored in memory 208. In another example of block 1202, first text string 706 is generated by administration server 104 and stored within memory 308. Block 1202 may further include generating modified first text 214 (also referred to as a QR text), for example by embodying first text string 706 as a QR code.

In embodiments, block 1202 includes storing, at the server 104, a data hash 707 based on the QR text 706 (or modified QR text 214). QR text hash 707 (AKA first text string hash) may be stored at server 104 (and never deleted) and used to verify future inputs of QR texts used for recovery of trusted phrases to identify whether those future inputs of QR texts match the QR text 706 used during registration of the user 101. It is undesirable to store multiple pieces of secure information, such as the QR text 706 and the point-and-pick value 232 at the server 104 because a bad-actor has easier access to these two pieces of information if they are stored at a single location. However, at the same time, it is desirable for the server 104 to be able to compare future instances of the QR-text received by the server 104, from the user 101 via interaction with user device 102, to verify that the future instances of the QR-text match the original QR-text submitted by user 101 during registration of the user. The QR text hash 707 may be a based on any hashing function known in the art. The QR text hash 707 is an irreversible representation of the QR text 706 or the modified QR text 214. However, the QR text hash 707 is not the actual QR text 706 or modified QR text 214, but instead a string of text/numbers created based on a mathematical function applied to the QR text 706 or modified QR text 214. Thus, because the hashing function used to generate QR text hash 707 is irreversible, the QR text hash 707 may be stored at server 104 without concern of releasing the QR text 706 or modified QR text 214.

At block 1204, a point-and-pick value is generated. In one example of block 1204, client-device phrase recovery module 230 generates point-and-pick value 232, shown in FIG. 2. In another example of block 1204, the point-and-pick value 232 is generated by administration server 104 and transmitted to the client-device phrase recovery module 230. It should be appreciated that client-device phrase recovery module 230 may be implemented at administration server 104, in at least one embodiment, instead of at client device 102.

Point-and-pick value 232 may be generated according to the following, which is an example only and not intended to be the only manner for generating point-and-pick value 232. A point-and-pick number may be a plurality of groups of three (or more) randomly generated numbers. Each group of three numbers includes two left digits and one right digit. For example, 374 includes the digit "37" and "4". Thus, each group includes two randomly generated numbers, the first number is a two digit number randomly generated between 10 and 99, and the second number is a single digit number randomly generated between 0 and 9. The two-digit value may be a "point" value, and the single digit value may be a "pick" value used for generating a meaningless phrase 234 as discussed below. Client-device phrase recovery module 230 may generate five groups, for example. More or fewer groups may be generated without departing from the scope hereof. In the case of five groups, the point-and-pick value 232 is 15 digits long, or five groups of three numbers. These numbers may be stored in memory 208 in association with, or in a location accessible by, client-device phrase recovery module 230. It should be appreciated that there are many ways to create the point-and-pick value 232 other than the above example. For example, block 1204 could be altered to generate a single digit many more times than five groups. The "point" could be odd numbers to show position in the number series, and the "pick" could be even numbers in the string. Alternatively, the Point and Pick are both the same number. The point-and-pick value may be generated from the QR text itself, instead of randomly generated. For example, the point-and-pick value may be a set of numbers that identifies how many characters to skip until selecting another character from the QR text to generate the meaningless phrase. Alternatively, the point-and-pick value may be every odd or even number within the QR text. Alternatively yet, the point-and-pick value could be a pick element that isn't a "number" but is achieved by different means such as, but not limited to, alphabets, characters, reference to some form of charts, geographical positions, or other data elements, and combinations thereof. The term "pick element" is inclusive of "point-and-pick value" in at least one embodiment At block 1206, method 1200 generates a meaningless phrase. In one embodiment of block 1206, client-device phrase recovery module 230 generates meaningless phrase 234. Meaningless phrase 234 is generated by using point-and-pick value 232 to obtain a random phrase from first text string 706 as obtained from modified first text 214 or as input into user interface 700 when registering user 101.

As discussed above, point-and-pick value 232 includes five groups of three digits: for example, 347238596875123 results in the following five groups: 347, 238, 596, 875, and 123. Each group, during block 1206 is used to select a portion of the first text string 706 for use in meaningless phrase 234. In certain embodiments, each group may be modified by a modification value when selecting the portion of the first text string 706. The modification value may be based on the length of first text string 706, such as 100 when the first text string 706 is 300 or more words. For example, the first group may be unmodified. The second group may have 100 added to the listed point value so that a portion of the second 100 words in the first text string 706 are obtained for the meaningless phrase. The third group may have 200 added to the listed point value so that a portion of the second 200 words in the first text string 706 are obtained for the meaningless phrase. This modification occurs until the QR-text length is reached (e.g., if adding a multiplication of the modification value results in a number greater than the QR-text length), then the next group has no modification and the process repeats.

An example of the above point-and-pick analysis on a QR-text being the first 300 words of the Declaration of Independence is as follows. In the following example, the portions used as the meaningless phrase are underlined, and a [X] is added in superscript, where X indicates the group number:

OR Text (300 Characters): "We hold these truths to be self-evident, that all men are created equal, that they are endowed by their Creator with certain unalienable Rights, that among these are Life, Liberty, and the pursuit of Happiness.—That to secure these rights, Governments are instituted among Men, deriving their just p"

Point-and-Pick Value: 347138196875123

TABLE 2

Meaningless Phrase Portions:

| Group | Point and Pick Value | Modified Point Value | Pick Value | Resulting portion of QR text using Modified Point and Pick Value. |
|---|---|---|---|---|
| 1 | 347 | 34 | 7 | ident, |
| 2 | 238 | 123 (23 plus 100) | 8 | n unalie |
| 3 | 596 | 259 (59 plus 200) | 6 | stitut |
| 4 | 875 | 87 (87 plus 300 is greater than QR text length, so no modification) | 5 | endow |
| 5 | 123 | 212 | 3 | Tha |

OR Text with meaningless phrase portions underlined: We hold these truths to be self-evident, [1]that all men are created equal, that they are endow[4]ed by their Creator with certain unalie[2]nable Rights, that among these are Life, Liberty, and the pursuit of Happiness.—Tha[5]t to secure these rights, Governments are institut[3]ed among Men, deriving their just p Resulting Meaningless Phrase: "ident, n unaliestitutendowTha"

In block 1208, the trusted phrase is then encrypted using the meaningless phrase. In one example of block 1208, client-device phrase recovery module 230 encrypts second text string 710 using meaningless phrase 234 to yield encrypted trusted phrase 236. After encryption, the meaningless phrase 234 may be deleted so that it is not stored anywhere. This provides a level of security that the encrypted trusted phrase may not be decrypted unless the meaningless phrase is recreated. Recreation of the meaningless phrase may be protected because the recovery module 230 is either operating on a different device, or is securely accessible only by a certain few employees of the hosting entity of administration server 104.

In block 1210, the encrypted trusted phrase and point-and-pick value are then transmitted from client device to the administration server. As discussed above, however, other Segments than the point-and-pick value may be stored at the administration server. As such, in one example of block 1210, the encrypted trusted phrase and the first text string 706 are stored at the administration server 104, and the client device 102 and/or user 101 maintains the point-and-pick value. In one example of block 1210, client device 102 transmits point-and-pick value 232 (or first text string 706) and encrypted trusted phrase 236 to administration server 104. Administration server 104 then stores the received point-and-pick value 232 (or first text string 706) and encrypted trusted phrase 236 in the associated user profile 310. Additionally, or alternatively, if administration-server phrase recovery module 320 is located at a separate server than administration server 104, or separate hardware from that storing one or more user profiles 310, the received point-and-pick value 232 (or first text string 706) and encrypted trusted phrase 236 may be stored in memory accessible by or associated with administration-server phrase recovery module 320. Furthermore, the point-and-pick value 232, meaningless phrase 234, and encrypted trusted phrase 236 at the client device 102 may be deleted thereafter so that the client device 102 cannot be hacked to steal the meaningless phrase or point-and-pick value to decrypt the encrypted trusted phrase 236.

The above process for generating encrypted trusted phrase maintains the multi-party security level advantages discussed herein. The encrypted trusted phrase 236, first text string 706, and point-and-pick value 232 are not useable by themselves, or with just the two of them, they are only useable with either the QR text (to regenerate the meaningless phrase), or with the meaningless phrase itself. Because the encrypted trusted phrase 236, first text string 706, and point-and-pick value 232 are not useable by themselves (or with just the two of them), and because the second text string 710 or modified first text 214 is in user 101 possession and never accessed by or transmitted to administration server 104, there is no ability to decrypt the encrypted trusted phrase 236 by a malicious entity associated with the entity hosting administration server 104.

Server-Level Application Access

To further increase security of the processes discussed herein, including the functionality associated with administration server 104 and user device 102, administration server 104 may further include an application hosting module 340 in at least some embodiments. Application hosting module 340 configures a temporary application hosting "session" and associated access folder 342. Temporary access session/folder 342 is created in response to user 101 logging in using userID 312 and password 212 as discussed above with reference to FIG. 900. Temporary access session/folder 342 may be accessible only for a predetermined length of time after successful login by user 101. The predetermined length of time and accessibility of temporary access session/folder 342 may allow the user 101 to reaccess the temporary access session/folder 342 even if the user 101 exits the app on user device 102 and returns to the application within the predetermined length of time. At the conclusion of said predetermined length of time, the necessary data and access to temporary access session/folder 342 is terminated. Temporary access folder/session 342 is a user-specific instance of necessary information needed to run key management application 210. The temporary access session/folder 342 enables the key management application 210 to run and operate on the user device (other than user-login functionality). Upon user login, the temporary access folder/session 342 sends necessary information and software computer readable instructions from administration server 104 to user device 102, allowing user device 102 to run further functionality (other than the login functionality). By allowing the server 104 to host the software application, which is run on user device 101, additional security is added. Certain sensitive key operating data and associated computer readable instructions may not be fully stored on the user device 101, but instead only temporarily transmitted to, and used by, user device 101 under control of the application hosting module 340 at the server 104. Use of application hosting module 340 reduces further information hacking through the variety of third-party application and data access points also hosted by and at user device 101. In other words, because user device 101 only has access to the necessary information to implement the privacy-sensitive functionality of key management application 210 during the period of access granted by the access hosting module 340, vulnerability points at the user device 101 through applications unaffiliated with administration server 104 are reduced.

Trusted Phrase Recovery Process:

Accessing administration-server phrase recovery module 320 functionality may be restricted when administration-server phrase recovery module 320 is independent software simply having access to one or more user profiles 310 at administration server 104. In such instances, access to administration-server phrase recovery module 320 may require one or more authorization processes.

One such authorization process utilizes signaling device(s) 110 shown in FIG. 1 and requires administration-server phrase recovery module 320 to be implemented on separate hardware from the hardware associated with one or more user profiles 310. Device 110 are used to verify that the request for information associated with point-and-pick value 232 and encrypted trusted phrase 236 stored within user profile 310 within memory 308 is an authorized request and not coming from a device associated with a malicious entity. The present disclosure acknowledges that there needs to be protection added for the possibility of reverse engineering or hacking from within the entity hosting administration server 104. The multi-party storage discussed above is one aspect that addresses this problem. However, another aspect may be provided by utilizing an additional hardware at the administration server 104 required to even gain access to administration-server phrase recovery module 320. This provides an additional level of security even if the malicious party obtains the QR text described above, for example, and tries to recover the trusted phrase.

Figure 13:
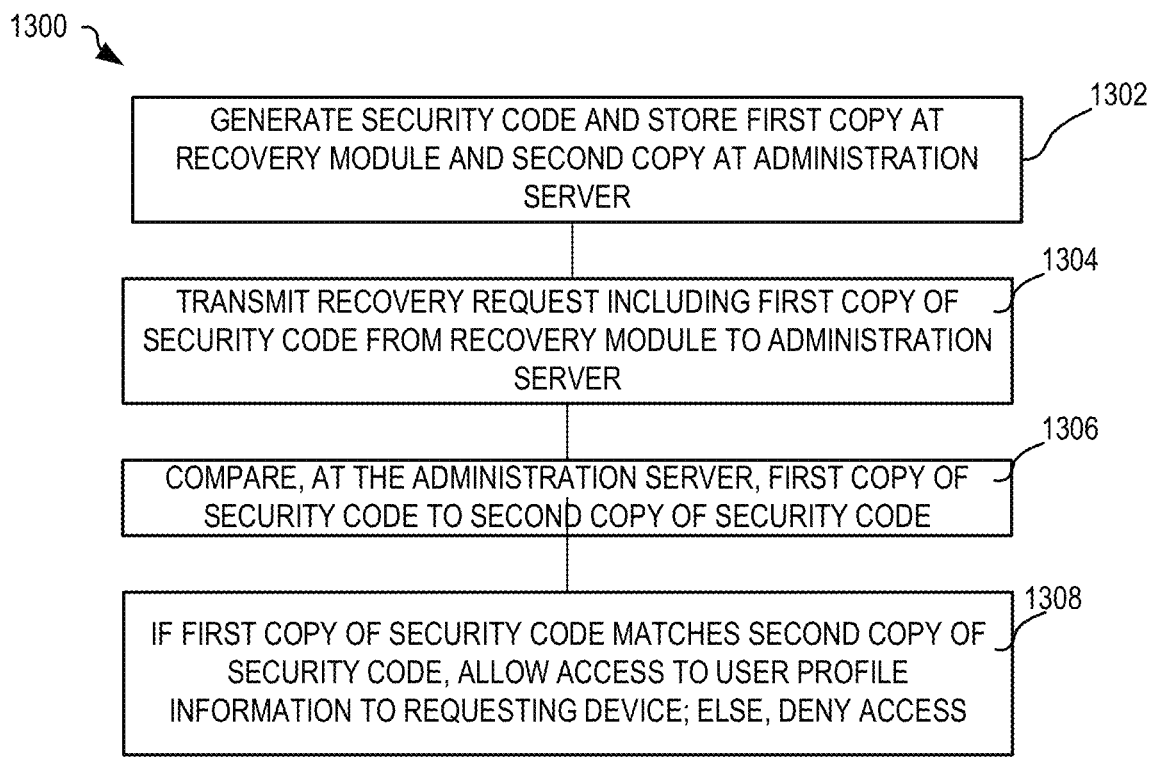
FIG. 13 shows a method for authorizing access to user profile information by administration server to a requesting device for purposes of trusted phrase recovery, in embodiments.

FIG. 13 shows a method 1300 for authorizing access to user profile information by administration server 104 to a requesting device for purposes of trusted phrase recovery, in embodiments.

In block 1302, a security code is generated and a first copy is transmitted to recovery device and a second copy is transmitted to the administration server. In an example of block 1302, security code 108 may be periodically produced by a signaling device 110. Signaling devices 110 may be a microprocessor or computer. Signaling device 110 may include two microprocessors or computers, one used to generate the security code 108, and another acting as standby. Signaling device 110 generates the security code 108 and transmits a first copy 322 of the security code for storage accessible only by administration-server phrase recovery module 320. Signaling device 110 further transmits a second copy 242 of the security code for storage within memory 308 of administration server 104.

In block 1304, the recovery device hosting trusted phrase recovery module transmits a recovery request 326 including the first copy of the security code to the administration server. In one example of block 1304, administration-server phrase recovery module 320 transmits a phrase recovery request 326 to administration server 104 requesting access to information within one or more user profiles 310, including, but not limited to, point-and-pick value 232 and encrypted trusted phrase 236 stored therein for recovery of the trusted phrase of user 101. Phrase recovery request 326 may be transmitted along with first copy 322 of security code 108.

In block 1306, the administration server compares the received first copy of security code with the previously received second copy of the security code. In one example of block 1306, administration server 104 compares the received first copy 322 of security code 108 received with phrase recovery request 326 to second copy 242 stored within memory 308.

In block 1308, if the first copy of the security code matches second copy of security code, the administration server allows access to the requested user profile information to the requesting device (such as the encrypted trusted phrase and/or the point-and-pick value); else, the administration server denies access to the requested user profile information to the requesting device.

Security of method 1300 may be further advantageously improved if signaling device 110 are modified such that they are output-only devices that only output the security code 108 and cannot receive data. Similarly, the recovery devices running administration-server phrase recovery module 320 may be modified so that no eternal software can be run on them and no program could be installed on them, or otherwise run from a central computer on dumb terminals.

Another authorization process, which may be used separately from or in conjunction with the above described authorization process of method 1300, requires approval of a threshold number of authorized officers at the entity hosting administration server 104 to allow access to administration-server phrase recovery module 320. Each time the administration-server phrase recovery module 320 is accessed, the detail of each officer is recorded with time and date of access, reason for access, plus proven details of the person requesting the access in an unchangeable and undeletable record shown as administrative authorizer(s) 328 in FIG. 3. Each administrative office may be required to complete all or part of the form discussed below with respect to user interface 1400.

Upon access to administration-server phrase recovery module 320, the authorized officers may be required to leave the vicinity of the recovery device running administration-server phrase recovery module 320 such that the trusted phrase, when recovered, is only given to the user 101, or authorized person of user 101. Thus, the recovery device 320 may include a recovery fetch button 350 (either manual or a digital button selectable on a display screen) that reveals the trusted phrase once recovered or otherwise enables the recovery process. The recovery fetch button 350 may be inactive if the authorized officers are in certain proximity to the recovery device, as indicated by RFID, GPS, or other locationing device worn by the authorized officers.

Figure 14:
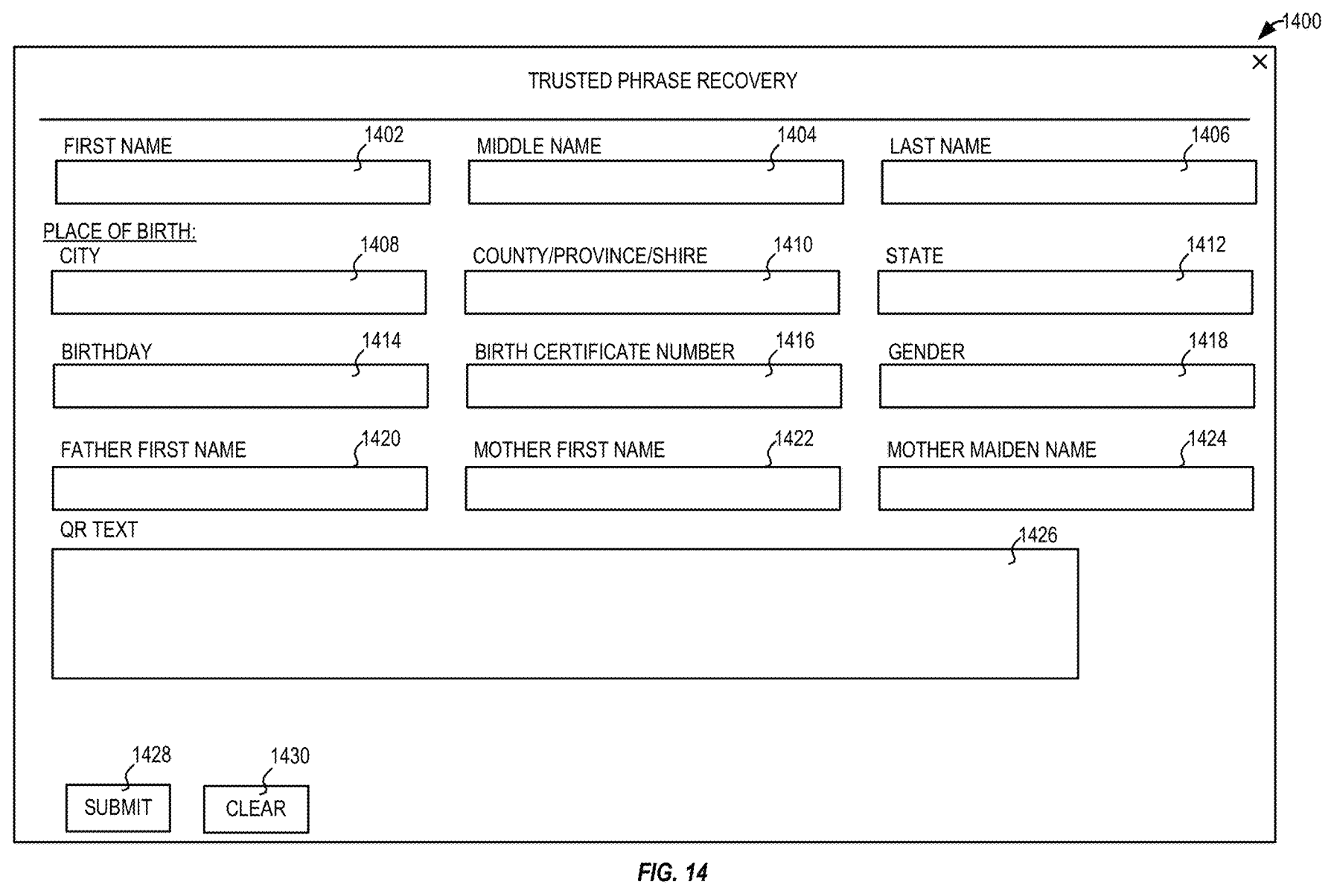

FIG. 14 depicts a user interface 1400 used for recovering trusted phrase. User interface 1400 may be displayed on hardware running administration-server phrase recovery module 320, thereby requiring user 101 to be at said hardware, or at least accessible via remote access. Prompt boxes 1402-1424 are similar to prompt boxes 602-604 and required by user 101 to verify that user 101 is who they say they are.

Additionally, for the form being filled out by user 101, a QR text prompt box 1426 is included. The user 101 may input the QR text into the prompt box 1426. The same text should be input that was input into prompt box 708. Alternatively, if modified first text 214 is a QR code, or other barcode or computer-readable information, the recovery device running administration-server phrase recovery module 320 may scan the modified first text 214 and obtain the necessary QR text therefrom. Other ways of obtaining the first text string 706 may occur, such as via receiving a computer file having the recovery text string therein; scanning a digital pattern having the recovery text string embedded therein; scanning a printout, a chart, or non-digital format having the recovery text string embedded therein; or other means. The information input into QR text prompt box 1426 is then stored as recovery text string 332.

In an embodiment where the administration server 104 stores the first text 706 instead of point-and-pick value, prompt box 1426 may be a prompt for the use to provide the previously-generated point-and-pick value. Similarly, the point-and-pick value may be embodied in a QR code, so the recovery device running administration-server phrase recovery module 320 may scan the QR code to obtain the point-and-pick value.

Figure 15:
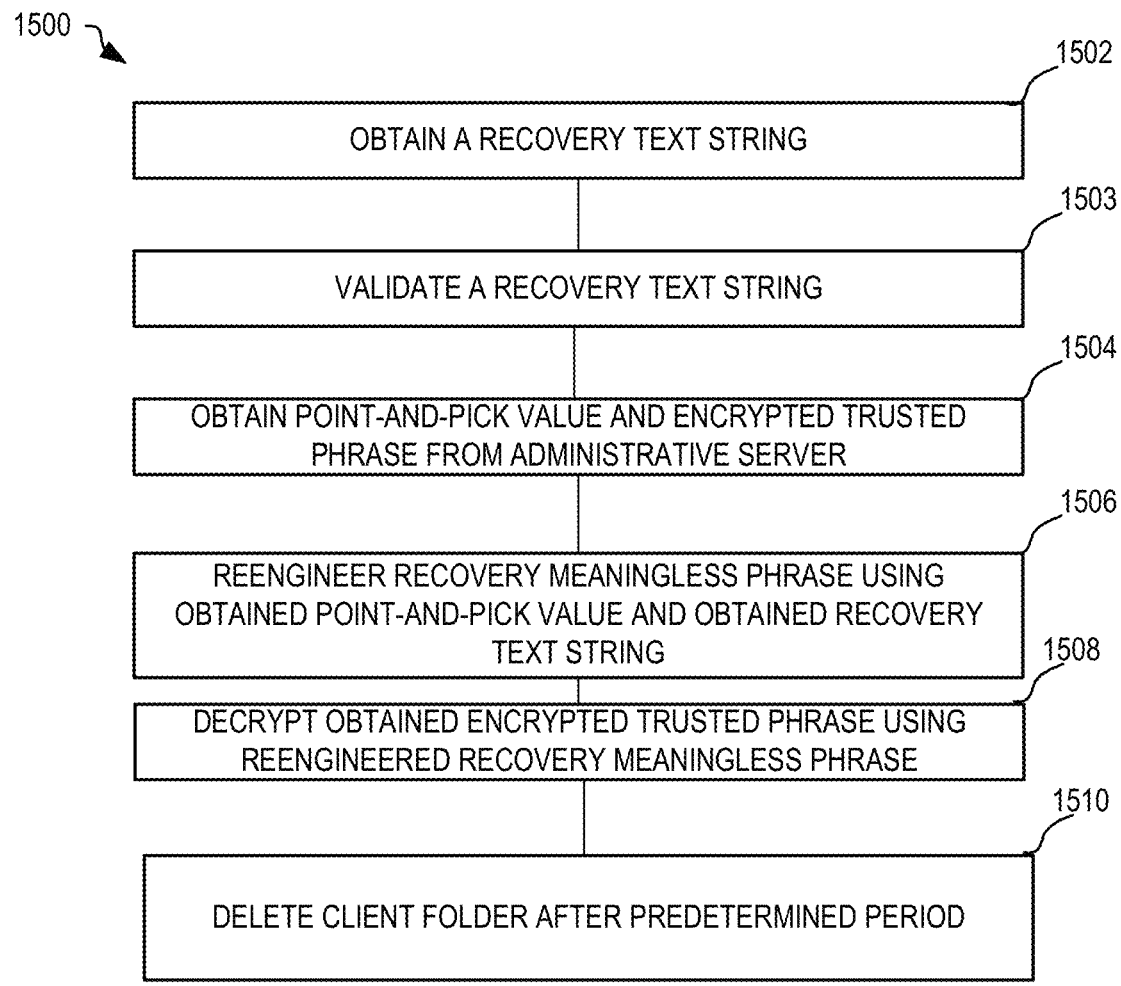
FIG. 15 shows a method for recovering a trusted phrase, in embodiments.

FIG. 15 shows a method 1500 for recovering a trusted phrase, in embodiments. Method 1500 is implemented using administration-server phrase recovery module 320. Method 1500 may be implemented after the above-discussed authorization processes.

At block 1502, a recovery text string is obtained. In one example of block 1502, recovery text string 332 is obtained. In an example, recovery text string 332 is obtained using QR text prompt box 1426 of user interface 1400.

At block 1503, the recovery text string is validated. In embodiments including block 1503, the validation processes addresses the situation where user 101, or a bad actor thereof, inputs a recovery text string that does not match the QR text 706, or modified QR text 214, created/used during registration of the user 101 (e.g., during block 1202 discussed above). If the recovery text string input during block 1502 doesn't match QR text 706 created during registration of user 101, then the trusted phrase recovery process described with regards to method 1500 would not work.

During registration process of user 101 discussed above, the user 101 may be informed that if the system can't verify future instances of QR texts received, then the trusted phrase may not be recoverable. As such, to validate the recovery text string, block 1503 may include receiving a recovery text string hash 333. Recovery text string hash 333 may be generated at user device 102 when recovery text string 332. Recovery text string hash 333 may be generated in the background of key management application 210 without user 101 knowing. Recovery text string hash 333 is transmitted to server 104. Administration server 104 then compares recovery text string hash 333 to QR text hash 707 generated and stored during registration of user 101. If recovery text string hash 333 matches QR text hash 707, then method 1500 proceeds. However, if recovery text string hash 333 does not match QR text hash 707, then administration server 104 may transmit an invalid recover text string prompt to client device 102 requiring user 101 to reenter a new recovery text string. Recovery text string hash 333 may be deleted at administration server 104 after the verification step.

In embodiments relying on recovery text string hash 333, it is valuable to include a verification process to ensure that a hash or encryption isn't corrupted during the process of creating recovery text string hash 333 or transmission of information to the administration server 104. As such, during creation of recovery text string hash 333, a test process may be included and performed (via execution of computer readable instructions by a processor) at the client device 102 without user 101 knowing. The test process may include sending the created recovery text string hash 333 to administration server 104. The sent recovery text string hash 333 is marked in the administration server 104 as a "waiting verification" state. Client device 102 then receives a duplicate recovery text string hash transmitted from the administration server 104 and compares the duplicate recover text string hash against the recovery text string hash 333 generated previously. If there is a match, then client device 102 transmits a "pass" message, in which the "waiting verification" state is removed. In the event of a non-match, recovery text string hash 333 may be recreated and the test process repeated until a pass message is received by administration server 104 from client device 102.

At block 1504, a point-and-pick value (or pick element) and encrypted trusted phrase is obtained from administrative server. In one example of block 1504, the point-and-pick value 232 (or pick element) and encrypted trusted phrase 236 is accessed from user profile one or more user profiles 310 within memory 308 of administration server 104. Block 1504 may include the above-discussed authorization process that utilizes signaling device 110.

At block 1506, a recovery meaningless phrase is reengineered using the obtained point-and-pick number (or pick element) and the obtained recovery text string. In one example of operation of block 1506, the administration-server phrase recovery module 320 uses the point-and-pick value 232 accessed from one or more user profiles 310 stored within memory 308 to reengineer a recovery meaningless phrase 334. The recovery meaningless phrase is reengineered according to the same methodology used to generate the meaningless phrase. For example, block 1506 may use the same methodology as block 1206.

At block 1508, the recovery meaningless phrase is used to decrypt the obtained encrypted trusted phrase to yield a recovery trusted phrase. In one example of block 1508, administration-server phrase recovery module 320 uses the recovery meaningless phrase 334 to decrypt the encrypted trusted phrase 236 accessed from one or more user profiles 310 stored within memory 308 to yield a recovered trusted phrase 338 and yield a recovery trusted phrase 336.

If the obtained recovery text string 332 matches the first text string 706 described above, then the recovery trusted phrase 336 should be the same as the trusted phrase input into prompt box 712 (e.g., second text string 710).

Method 1500 may further include block 1510 which includes deleting the associated client folder 410 and all data associated therewith after a predefined period. The recovering user may set up their own account/information after accessing the client folder 410 using the recovery trusted phrase 336 and repeat the above processes with their own user profile. This may be implemented when the person requesting recovery of the trusted phrase is different than user 101, or also when the person requesting recovery of the trusted phrase is user 101.

As discussed above, in some embodiments, the trusted phrase includes a plurality of sub-portions of trusted phrase that are each respectively associated with a different user to access a given client folder 410. In such instances, each sub-portion of the trusted phrase may be recoverable individually via method 1500. In such instances, each sub-portion of the trusted phrase may have an associated first text string, recovery text string, recovery text string hash, first text string hash, point-and-pick value (or pick element), meaningless phrase, and encrypted trusted phrase associated therewith. Alternatively or additionally, the entire trusted phrase and all sub-portions thereof may be recoverable at once via implementation of method 1500. In such instances, the total trusted phrase may have an associated first text string, recovery text string, recovery text string hash, first text string hash, point-and-pick value (or pick element), meaningless phrase, and encrypted trusted phrase associated therewith that is recoverable to obtain all associated sub-portions of the trusted phrase.

In the above, information may be sent between client device 102 and administration server 104 and/or storage server 106. In such instances, the information is encrypted via a hashing or other encryption algorithm. To verify correct transmission of the data sent between client device 102 and administration server 104 and/or storage server 106, the transmitted data from client device 102 is stored at administration server 104 and/or storage server 106. The encrypted and stored data is then transmitted back to client device 102 from administration server 104 and/or storage server 106, where client device 102 then decrypts the returned data. If the decrypted returned data, received by client device 102 from administration server 104 and/or storage server 106, matches the initially transmitted hashed or encrypted data from client device 102, then client device 102 may transmit a "pass" message to administration server 104 and/or storage server 106. In response to the pass message, the stored encrypted data is maintained in memory at administration server 104 and/or storage server 106. Alternatively, if the decrypted returned data, received by client device 102 from administration server 104 and/or storage server 106, doesn't match the initially transmitted hashed or encrypted data from client device 102, then client device 102 may transmit a "fail" message to administration server 104 and/or storage server 106, where the stored encrypted data is deleted in memory at administration server 104 and/or storage server 106, and the process of transmitting information from client device 102 to administration server 104 and/or storage server 106 is reiterated until the correct information is stored at administration server 104 and/or storage server 106. The user 101 may or may not be aware of this verification process. In other words, the verification process may occur in the background of key management application 210 and not noticeable to the user 101 via a user interface of user 101.

It should be appreciated that, in the above, some description may include a user performing one or more actions (e.g., a user may interact with a device). In such description, it should be appreciated that the device may include one or more input/output systems (e.g., touch screen, mouse/keyboard, microphone, camera, speaker, etc.) that is capable of detecting said interaction, processing the detected interaction, and defining associated device-data necessary to interpret and, if necessary, act on said associated device-data.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document. As such, changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for recovering a trusted phrase text string, comprising:
   obtaining a recovery text string;
   obtaining a point-and-pick value and an encrypted trusted phrase;
   obtaining a recovery meaningless phrase using the obtained point-and-pick value and the recovery text string;
   decrypting the encrypted trusted phrase using the recovery meaningless phrase to yield the trusted phrase text string.

2. The method of claim 1, wherein the obtaining a recovery text string comprises one or more of: scanning a QR code having the recovery text string embedded therein; receiving a computer file having the recovery text string therein; scanning a digital pattern having the recovery text string embedded therein; scanning a printout, a chart, or non-digital format having the recovery text string embedded therein.

3. The method of claim 1, wherein the recovering the trusted phrase text string is implemented using a recovery module, the method further comprising accessing the recovery module by:
   transmitting a recovery request including a first copy of a security code from the recovery module to an administration server;
   comparing at the administration server, the first copy to a second copy of the security code stored at the administration server;
   allowing access to the encrypted trusted phrase and the point-and-pick value when the first copy matches the second copy.

4. The method of claim 3, wherein the first copy and the second copy are generated by a signaling device that is an output-only device.

5. The method of claim 3, wherein accessing the recovery module further comprises obtaining approval from a threshold number of authorized personnel of the administrative server.

6. The method of claim 1, further comprising:
   receiving an additional text string;
   receiving the point-and-pick value;
   obtaining a meaningless phrase based on the another text string and the point-and-pick value;
   encrypting the trusted phrase text string using the meaningless phrase as the encryption phrase to yield the encrypted trusted phrase; and,
   transmitting the encrypted trusted phrase to an external device.

7. The method of claim 6, further comprising converting the additional text string into a modified text string, the modified text string comprising one or more of a QR code, barcode, and watermarked image.

8. The method of claim 1, further comprising verifying the recovery text string against a previous text string used to generate the encrypted trusted phrase text string.

9. The method of claim 8, wherein verifying the recovery text string comprises:
   receiving a first data hash of the previous text string used to generate the encrypted trusted phrase;
   receiving a second data hash of the recovery text string;
   comparing the first data hash to the second data hash to verify the recovery text string.

10. The method of claim 9, further comprising storing the first data hash and the point-and-pick value at a recovery server.

11. The method of claim 1, wherein the trusted phrase includes a plurality of sub-portions of trusted phrase.

12. The method of claim 11, wherein recovering the trusted phrase text string from the encrypted trusted phrase includes recovering one of the sub-portions of trusted phrase text string; and wherein the recovery text string, the point-and-pick value, the encrypted trusted phrase, and the recovery text string are all associated with the one of the sub-portions of trusted phrase.

13. The method of claim 11, wherein recovering the trusted phrase text string from the encrypted trusted phrase includes recovering all of the sub-portions of the trusted phrase text string at the same time; and wherein the recovery text string, the point-and-pick value, the encrypted trusted phrase, and the recovery text string are all associated with the trusted phrase text string.

14. A system for recovering a first data element, comprising:
   a storage device storing an encrypted version of the first data element, and a pick element used to obtain a second data element used to generate the encrypted version of the first data element;
   a processor; and
   non-transitory computer readable instructions that, when executed by the processor, cause the system to:
      obtain a recovery data element;
      obtain the encrypted version of the first data element and the pick element;
      obtain the second data element using the recovery data and the pick element;
      decrypt the encrypted version of the first data element using the second data element to obtain the first data element.

15. The system of claim 14, wherein:
   the first data element is a trusted phrase text string;
   the second data element is a meaningless phrase text string;
   the pick element is a point-and-pick value; and
   the recovery data element is a recovery text string.

16. The system of claim 15, the non-transitory computer readable instructions being implemented as a recovery module; wherein the recovery module is accessible in response to:
   transmitting a recovery request including a first copy of a security code from the recovery module to an administration server;

comparing at an administration server, the first copy to a second copy of the security code received at the administration server;

allowing access to encrypted version of the first data element and the pick element from the storage device when the first copy matches the second copy.

17. The system of claim 16, wherein the first copy and the second copy are generated by a signaling device that is an output-only device.

18. The system of claim 16, wherein the recovery module is accessible in further response to: obtaining approval from a threshold number of authorized personnel of the administrative server.

19. The system of claim 14, wherein the recovery data element is obtained by one or more of: scanning a QR code having the recovery data element embedded therein; receiving a computer file having the recovery data element therein; scanning a digital pattern having the recovery data element embedded therein; scanning a printout, a chart, or non-digital format having the recovery data element embedded therein.

20. The system of claim 14, further comprising a registration module comprising further non-transitory computer readable instructions that when executed cause the system to:
receive an additional data element;
receive the pick element;
obtain the second data element based on the additional data element and the pick element;
encrypt the first data element using the second data element as an encryption phrase to yield the encrypted version of the first data element; and,
transmit the encrypted version of the first data element to an external device.

21. The system of claim 20, wherein:
the first data element is a trusted phrase text string;
the second data element is a meaningless phrase text string;
the additional data element is a QR text string;
the pick element is a point-and-pick value; and
the recovery data element is a recovery text string.

22. The system of claim 20, further comprising an additional data element hash; wherein the recovery data element is verifiable by comparing a recovery data element hash to the additional data element hash.

23. The system of claim 14, wherein the first data element includes a plurality of sub-portions of the first data element.

24. The system of claim 23, wherein recovering the first data element from the encrypted version of the first data element includes recovering one of the sub-portions of the first data element; and wherein the recovery data element, the pick element, the second data element, are all associated with the one of the sub-portions of the first data element.

25. The system of claim 23, wherein recovering the first data element from the encrypted version of the first data element includes recovering all of the sub-portions of the first data element at the same time; and wherein the recovery data element, the pick element, the second data element, are all associated with the first data element.

26. A method for recovering a first data element, comprising:
storing an encrypted version of the first data element and a pick element used to obtain a second data element used to generate the encrypted version of the first data element;
recovering the first data element from the encrypted version of the first data element by:
obtaining a recovery data element;
obtaining the pick element and the encrypted version of the first data element;
obtaining the second data element using the obtained pick element and the recovery data element;
decrypting the encrypted version of the first data using the second data element to yield the first data element.

27. The method of claim 26, wherein the obtaining the recovery data element comprises one or more of: scanning a QR code having the recovery data element embedded therein; receiving a computer file having the recovery data element therein; scanning a digital pattern having the recovery data element embedded therein; scanning a printout, a chart, or non-digital format having the recovery data element embedded therein.

28. The method of claim 26, wherein the recovering the first data element is implemented using a recovery module, the method further comprising accessing the recovery module by:
transmitting a recovery request including a first copy of a security code from the recovery module to an administration server;
comparing at the administration server, the first copy to a second copy of the security code stored at the administration server;
allowing access to the encrypted version of the first data element and the pick element when the first copy matches the second copy.

29. The method of claim 28, wherein the first copy and the second copy are generated by a signaling device that is an output-only device.

30. The method of claim 28, wherein accessing the recovery module further comprises obtaining approval from a threshold number of authorized personnel of the administrative server.

31. The method of claim 26, the storing the encrypted version of the first data element comprising:
receiving an additional data element;
receiving the pick element;
obtaining the second data element based on the additional data element and the pick element;
encrypting the second data element based on the additional data element and the pick element; and,
transmitting the encrypted version of the first data element to an external device.

32. The method of claim 31, further comprising converting the additional data element into a modified data element, the modified data element comprising one or more of a QR code, barcode, and watermarked image.

33. The method of claim 26, further comprising verifying the recovery data element against a previous data element used to generate the encrypted version of the first data element.

34. The method of claim 33, wherein verifying the recovery data element comprises:
receiving a first data hash of the previous data element used to generate the encrypted version of the first data element;
receiving a second data hash of the recovery data element;
comparing the first data hash to the second data hash to verify the recovery data element.

35. The method of claim 34, further comprising storing the first data hash and the pick element at a recovery server.

36. The method of claim 26, wherein the first data element includes a plurality of sub-portions of the first data element.

37. The method of claim 36, wherein recovering the first data element from the encrypted version of the first data element includes recovering one of the sub-portions of the first data element; and wherein the recovery data element, the pick element, the encrypted version of the first data, and the recovery data element are all associated with the one of the sub-portions of the first data element.

38. The method of claim 36, wherein recovering the first data element from the encrypted version of the first data element includes recovering all of the sub-portions of the first data element at the same time; and wherein the recovery data element, the pick element, the encrypted version of the first data, and the recovery data element are all associated with the first data element.

* * * * *